(12) United States Patent
Havemose

(10) Patent No.: US 9,710,798 B1
(45) Date of Patent: *Jul. 18, 2017

(54) SYSTEM AND METHOD FOR USAGE BILLING OF HOSTED APPLICATIONS

(71) Applicant: OPEN INVENTION NETWORK LLC, Durham, NC (US)

(72) Inventor: Allan Havemose, Arroyo Grande, CA (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,795

(22) Filed: Feb. 4, 2017

Related U.S. Application Data

(63) Continuation of application No. 14/720,804, filed on May 24, 2015, now Pat. No. 9,563,883, which is a continuation of application No. 14/458,917, filed on Aug. 13, 2014, now Pat. No. 9,058,600, which is a continuation of application No. 14/159,884, filed on Jan. 21, 2014, now Pat. No. 8,818,886, which is a continuation of application No. 13/844,853, filed on Mar. 16, 2013, now Pat. No. 8,639,599, which is a
(Continued)

(51) Int. Cl.
| | |
|---|---|
| *G06F 15/16* | (2006.01) |
| *G06F 15/173* | (2006.01) |
| *G07F 19/00* | (2006.01) |
| *G06Q 20/14* | (2012.01) |
| *H04L 29/08* | (2006.01) |
| *H04L 29/06* | (2006.01) |

(52) U.S. Cl.
CPC .......... *G06Q 20/14* (2013.01); *G06Q 20/145* (2013.01); *H04L 29/06* (2013.01); *H04L 29/08072* (2013.01)

(58) Field of Classification Search
CPC ... H04L 29/06; H04L 29/08072; G06Q 30/00; G06Q 40/00
USPC .......... 705/30, 34, 52; 703/21, 23; 709/203, 709/219, 220, 224–230
See application file for complete search history.

(56) References Cited

U.S. PATENT DOCUMENTS

| | | | | |
|---|---|---|---|---|
| 6,167,385 A | * | 12/2000 | Hartley-Urquhart | G06Q 10/0635 705/28 |
| 6,941,281 B1 | * | 9/2005 | Johnson | G06Q 20/04 705/35 |

(Continued)

*Primary Examiner* — Olusegun Goyea
(74) *Attorney, Agent, or Firm* — Haynes and Boone, LLP

(57) ABSTRACT

A system, method, and computer readable medium for usage billing of one or more hosted applications serving one or more clients. The hosted applications are contained within one or more isolated environments or run without isolated environments. The system may include usage billing based on one or more of resources open, amount of data flowing through resources, number of open files, number of transactions, number of concurrent users, number of processes, CPU utilization and memory usage, The system may further include a management interface where administrators may add, remove and configure isolated environments, configure client policies and credentials, and force upgrades. If using isolated environments, the isolated environments may be isolated from other applications and the host operating system on the clients and applications within the isolated environments may run without performing an application-installation on the client.

20 Claims, 13 Drawing Sheets

System Overview

Related U.S. Application Data continuation of application No. 12/851,639, filed on Aug. 6, 2010, now Pat. No. 8,401,940, which is a continuation-in-part of application No. 12/813,593, filed on Jun. 11, 2010, now Pat. No. 8,539,488, which is a continuation-in-part of application No. 12/421,691, filed on Apr. 10, 2009, now Pat. No. 8,341,631.

(56) References Cited

U.S. PATENT DOCUMENTS

| | | | | |
|---|---|---|---|---|
| 7,353,203 B1* | 4/2008 | Kriplani | G06Q 20/02 | 705/39 |
| 2002/0038277 A1* | 3/2002 | Yuan | G06Q 30/0601 | 705/37 |
| 2004/0064398 A1* | 4/2004 | Browne | G06Q 40/04 | 705/37 |
| 2007/0174191 A1* | 7/2007 | Keaton | G06Q 20/10 | 705/40 |
| 2007/0255653 A1* | 11/2007 | Tumminaro | G06Q 20/10 | 705/39 |
| 2008/0154769 A1* | 6/2008 | Anderson | G06Q 20/102 | 705/40 |
| 2010/0268667 A1* | 10/2010 | King | G06Q 40/04 | 705/36 R |
| 2013/0054484 A1* | 2/2013 | Hoeflinger | G06Q 30/02 | 705/329 |
| 2013/0204664 A1* | 8/2013 | Romagnolo | G06Q 30/0203 | 705/7.32 |
| 2013/0226688 A1* | 8/2013 | Harvilicz | G06Q 30/02 | 705/14.39 |
| 2014/0032298 A1* | 1/2014 | Corrie | G06Q 30/0246 | 705/14.27 |
| 2014/0032307 A1* | 1/2014 | Corrie | G06Q 30/0246 | 705/14.45 |
| 2014/0032308 A1* | 1/2014 | Corrie | G06Q 30/0246 | 705/14.45 |
| 2014/0032309 A1* | 1/2014 | Corrie | G06Q 30/0246 | 705/14.45 |
| 2014/0032310 A1* | 1/2014 | Corrie | G06Q 30/0246 | 705/14.45 |
| 2014/0058804 A1* | 2/2014 | Zhou | G06Q 10/101 | 705/12 |
| 2014/0143120 A1* | 5/2014 | Clarke | G06Q 40/04 | 705/37 |
| 2014/0164049 A1* | 6/2014 | Yakos | G06Q 10/0633 | 705/7.27 |
| 2014/0171039 A1* | 6/2014 | Bjontegard | H04L 29/06034 | 455/414.1 |
| 2014/0244486 A1* | 8/2014 | Abril | G06Q 20/223 | 705/39 |
| 2014/0279682 A1* | 9/2014 | Feldman | G06Q 40/06 | 705/36 R |
| 2014/0304137 A1* | 10/2014 | Olson | G06Q 40/04 | 705/37 |
| 2014/0316823 A1* | 10/2014 | Cooper | G06Q 40/08 | 705/4 |
| 2014/0351116 A1* | 11/2014 | Hoff | G06Q 40/025 | 705/38 |
| 2014/0358766 A1* | 12/2014 | Nayyar | G06Q 40/025 | 705/38 |

* cited by examiner

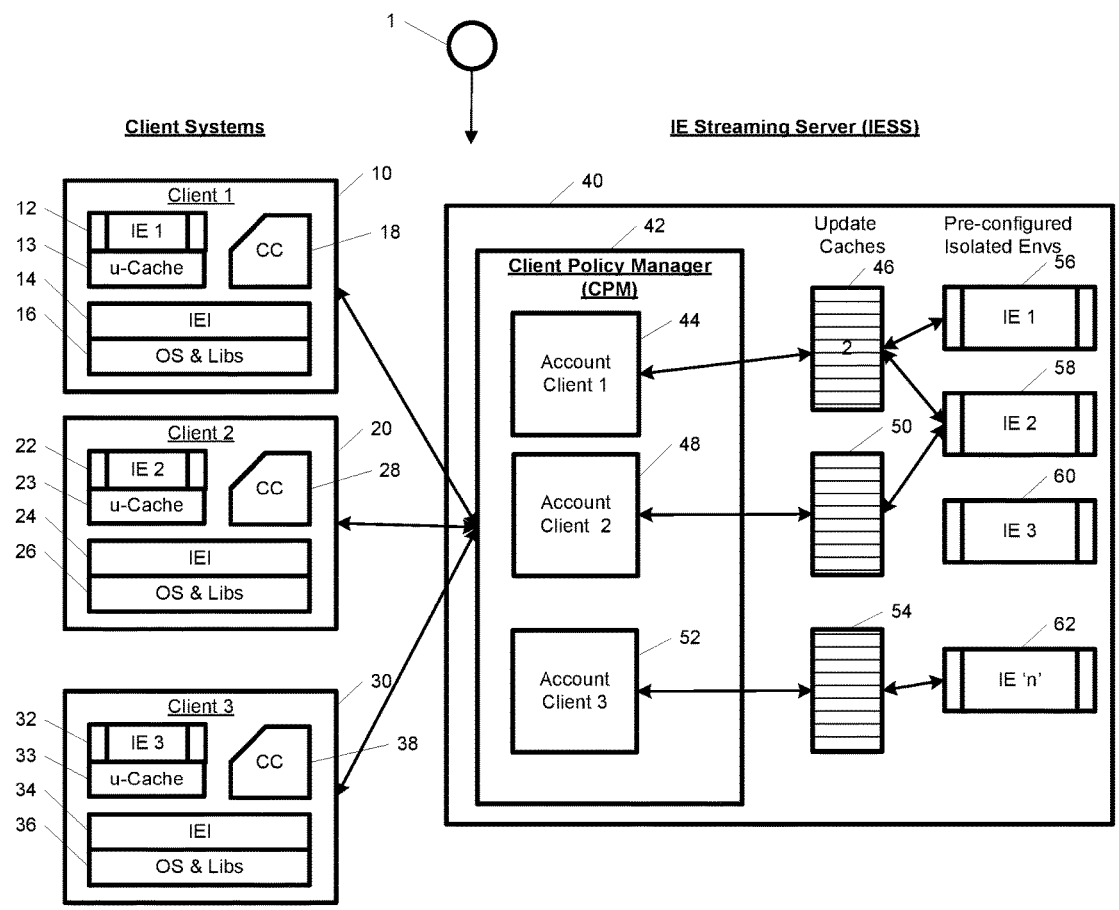
FIG.1 – System Overview

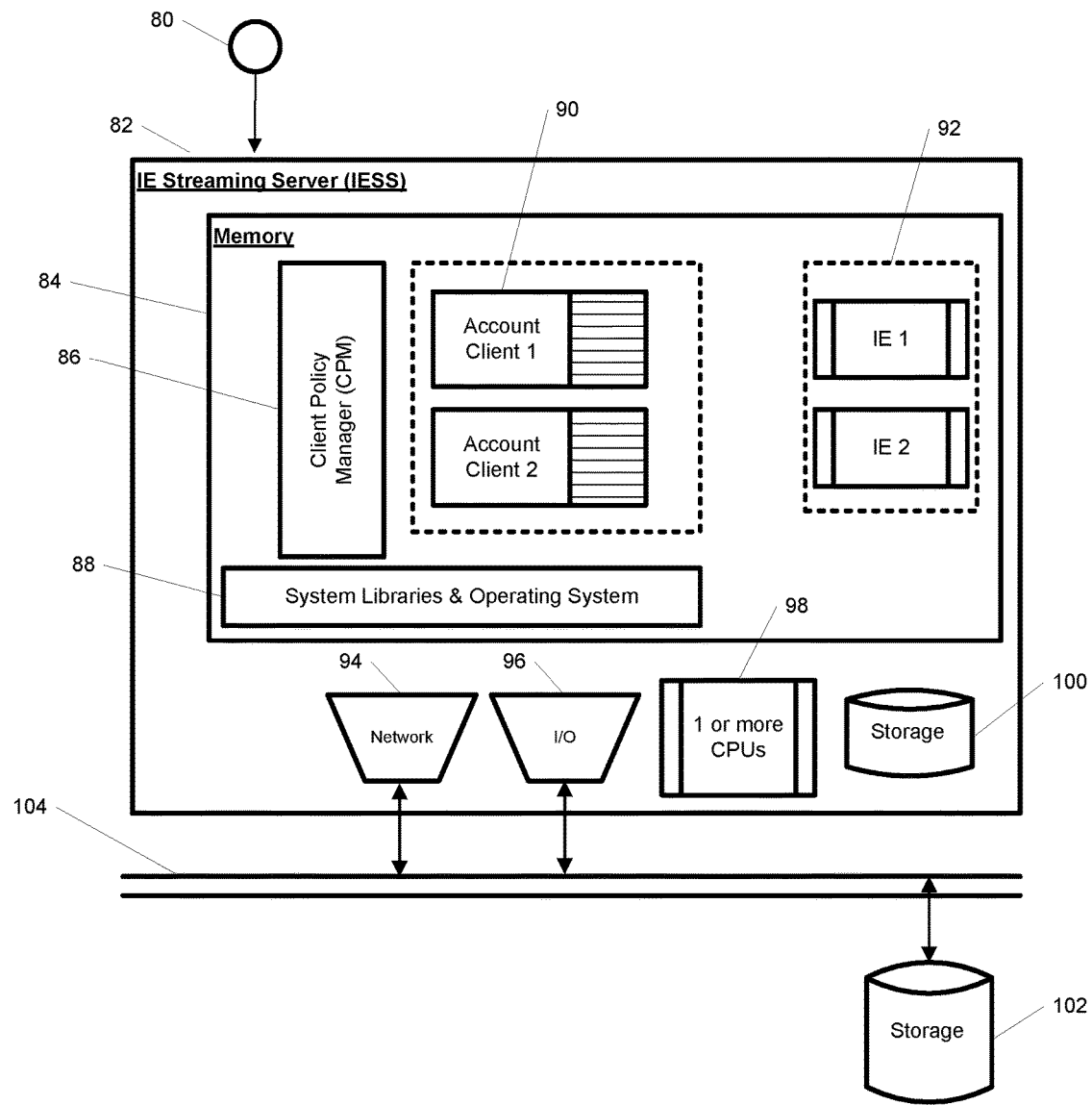
FIG.2 – IESS Overview

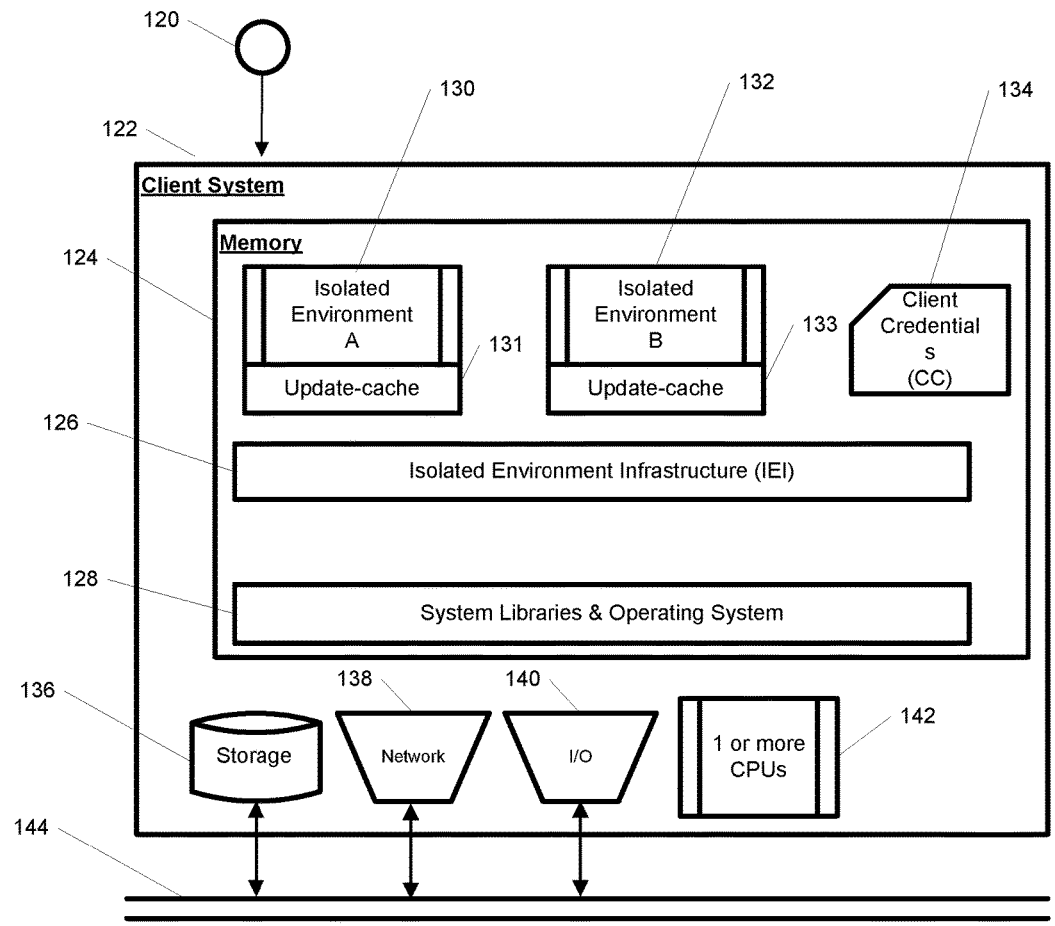
FIG.3 – Client System Overview

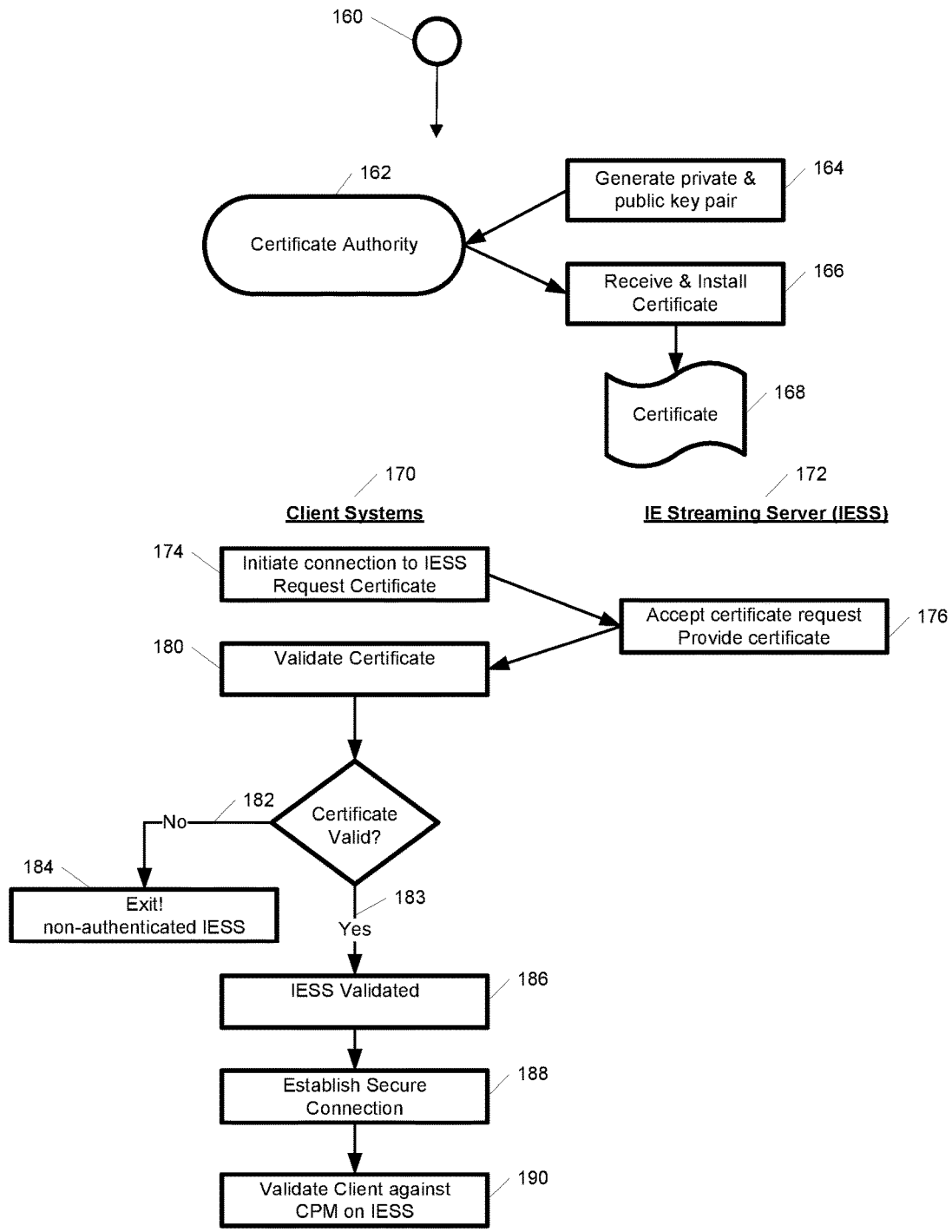
FIG.4 – IESS Credentials – Establishing Secure connections

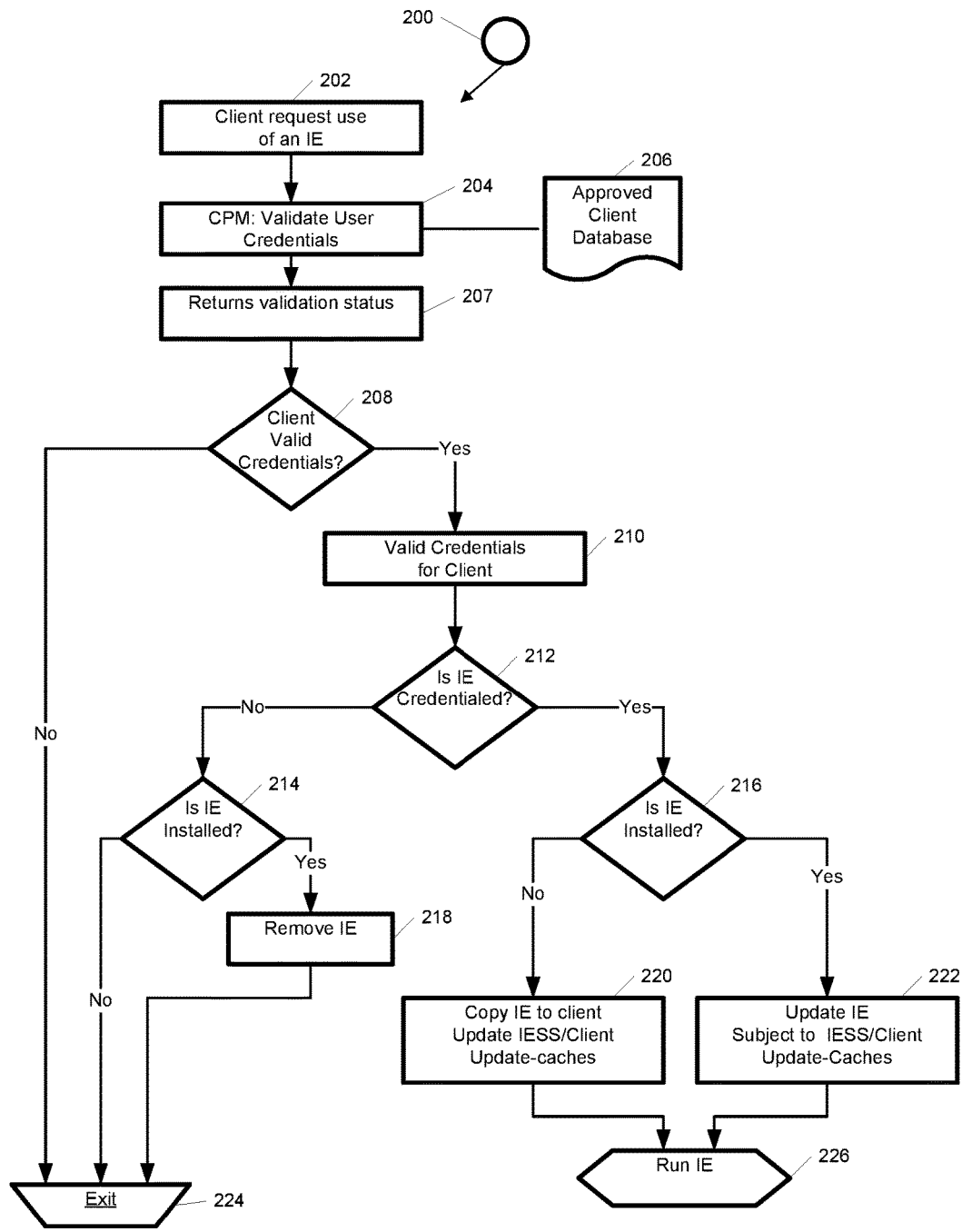
FIG.5 – Establishing Client credentials

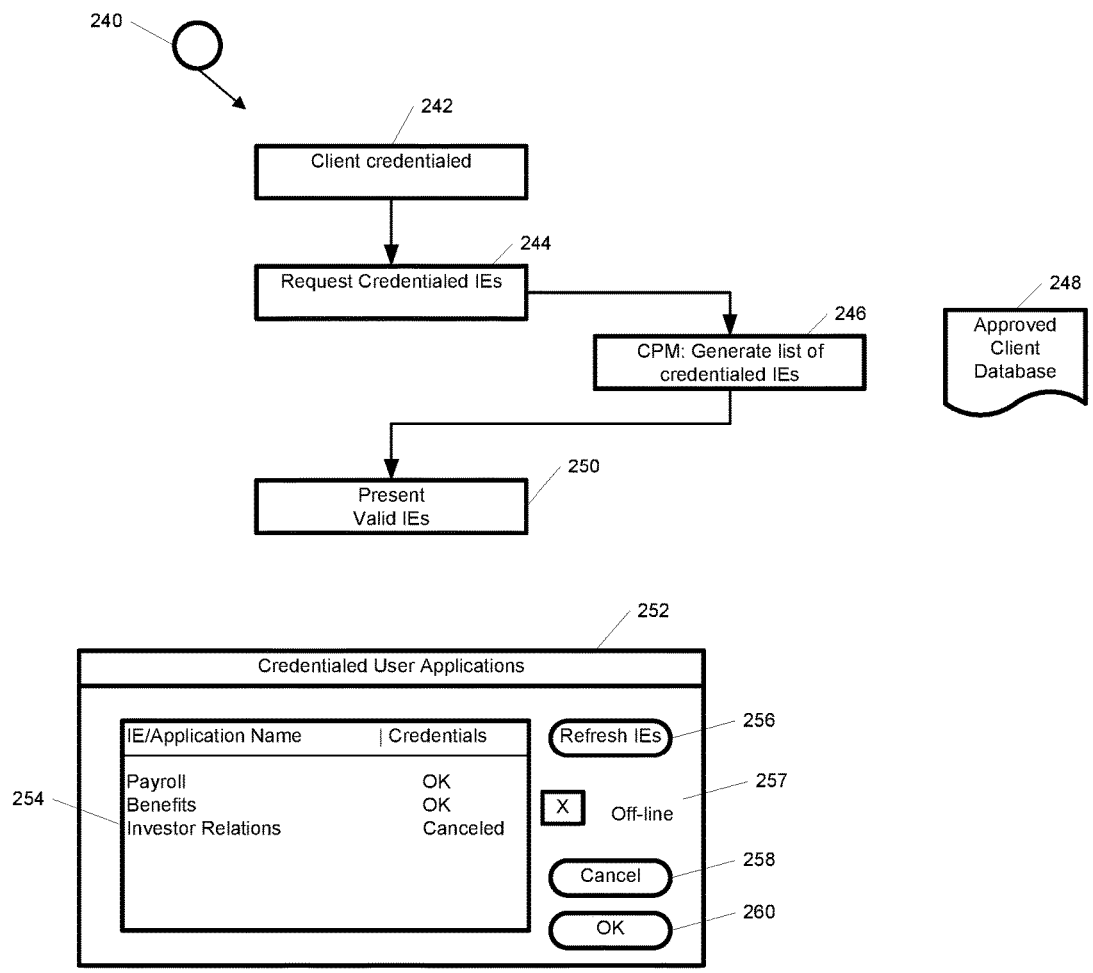
FIG.6 – Determining credentialed IEs

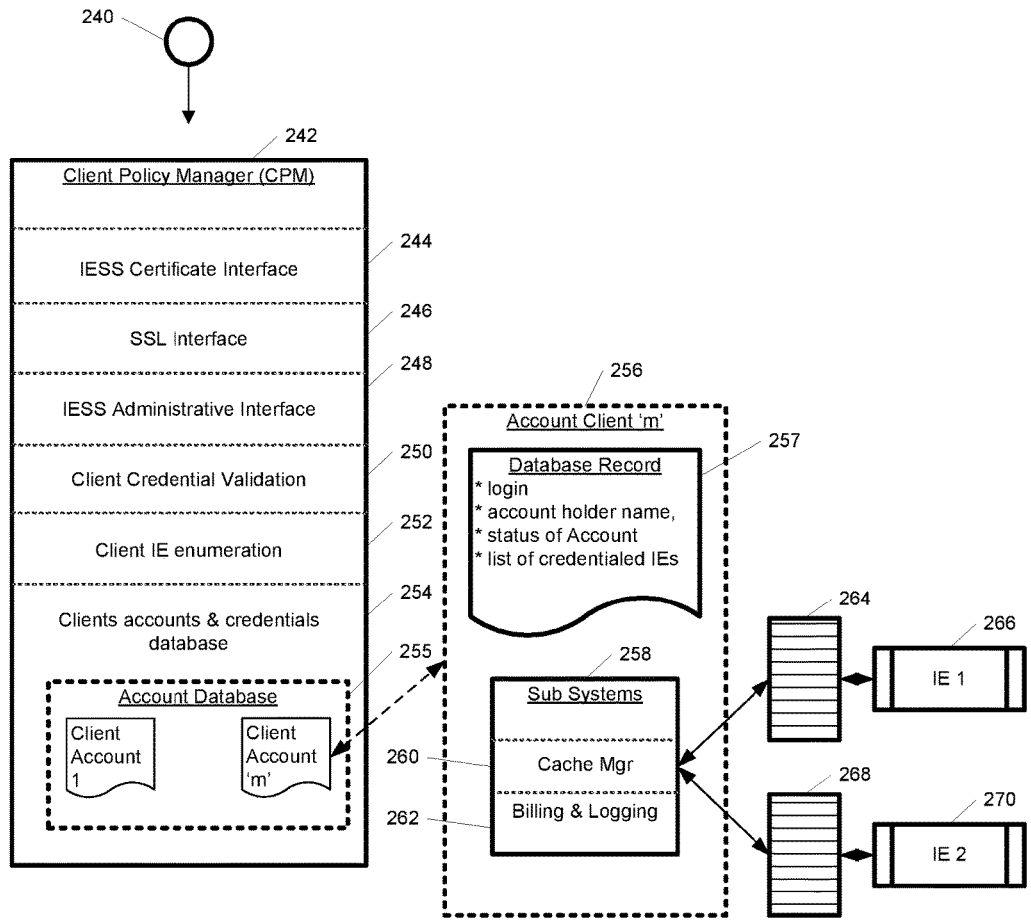
FIG.7 – Client Policy Manager

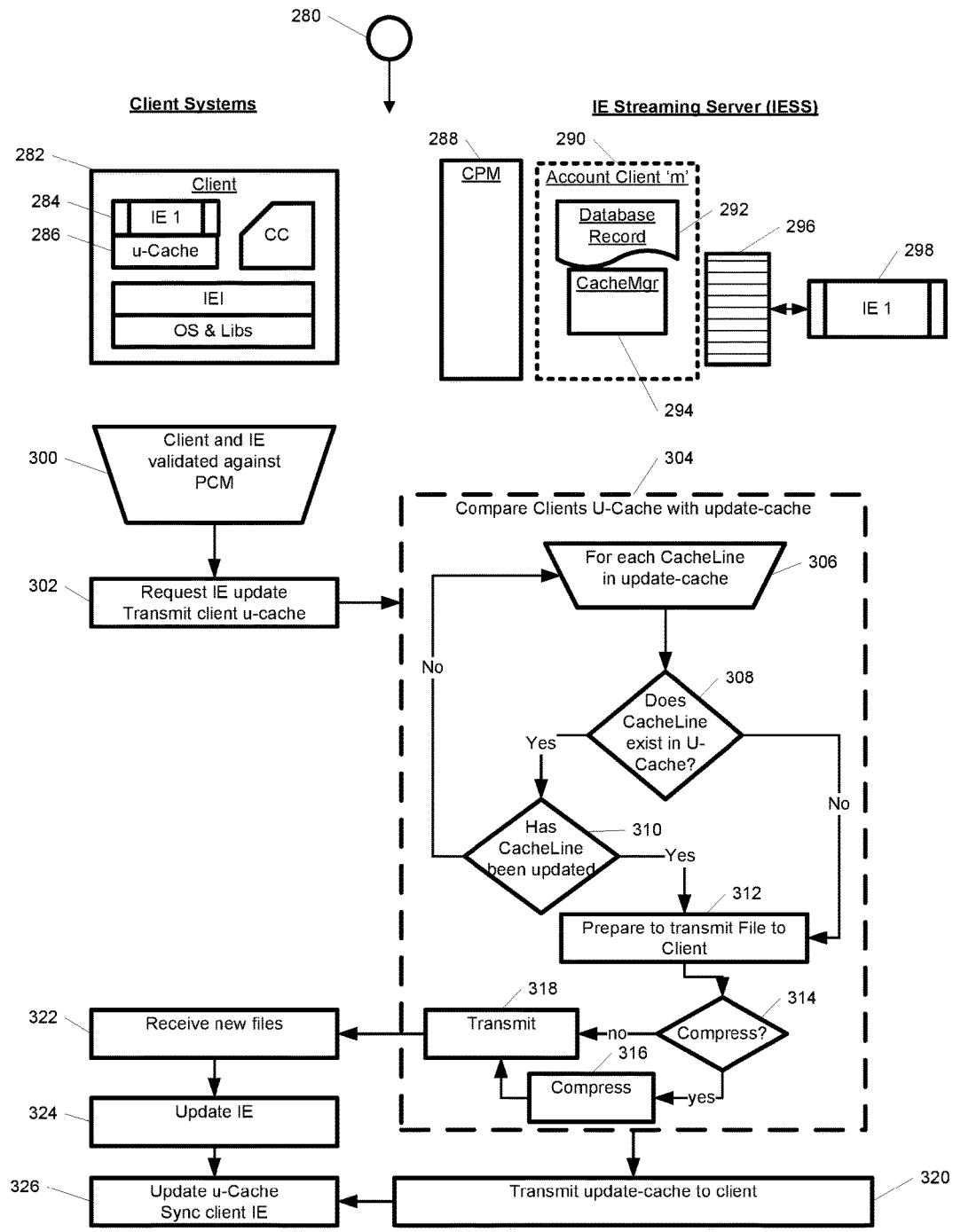
FIG.8 – Client synchronization with update-cache

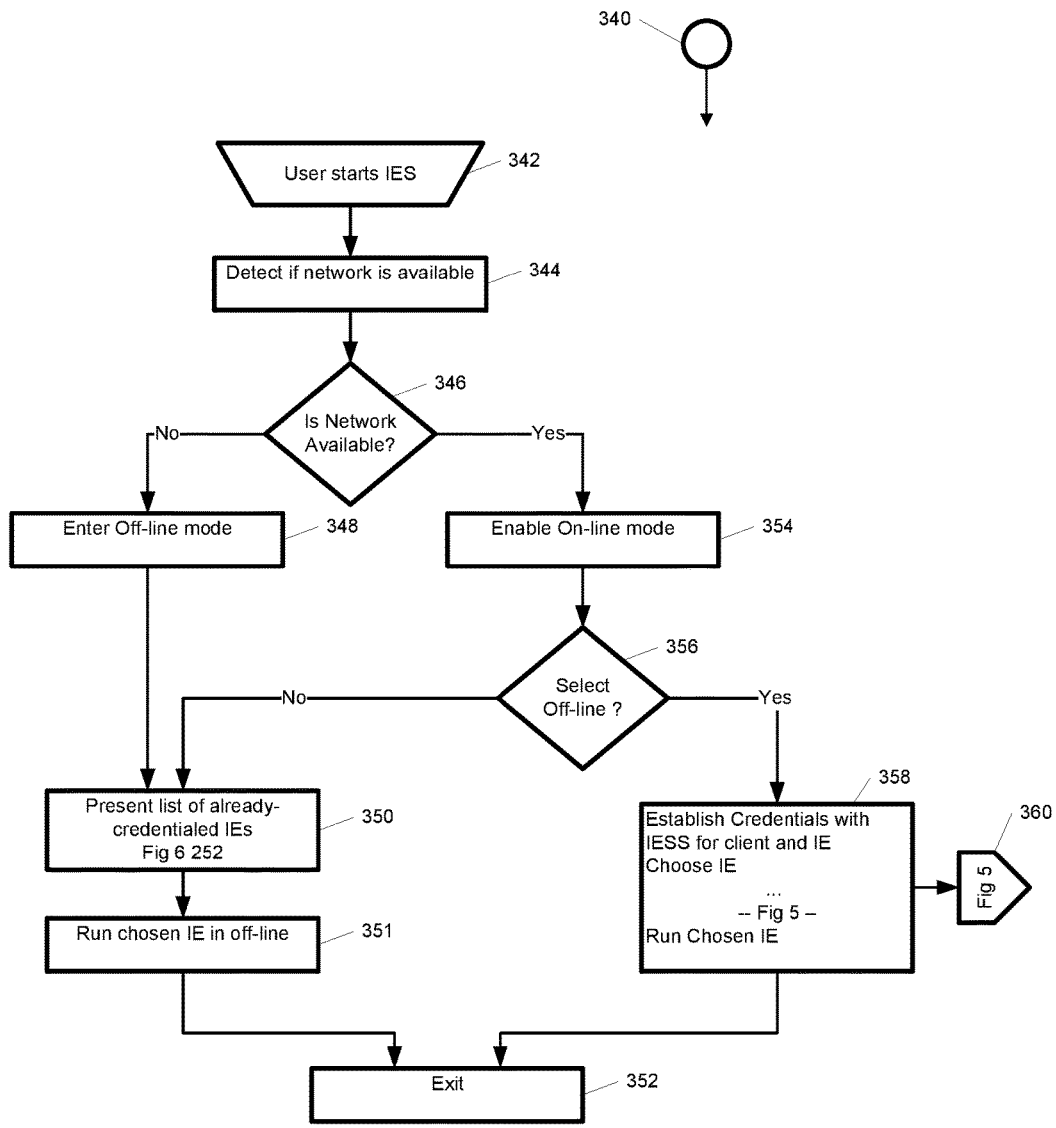
FIG.9 – Client launch with Off-line and On-line

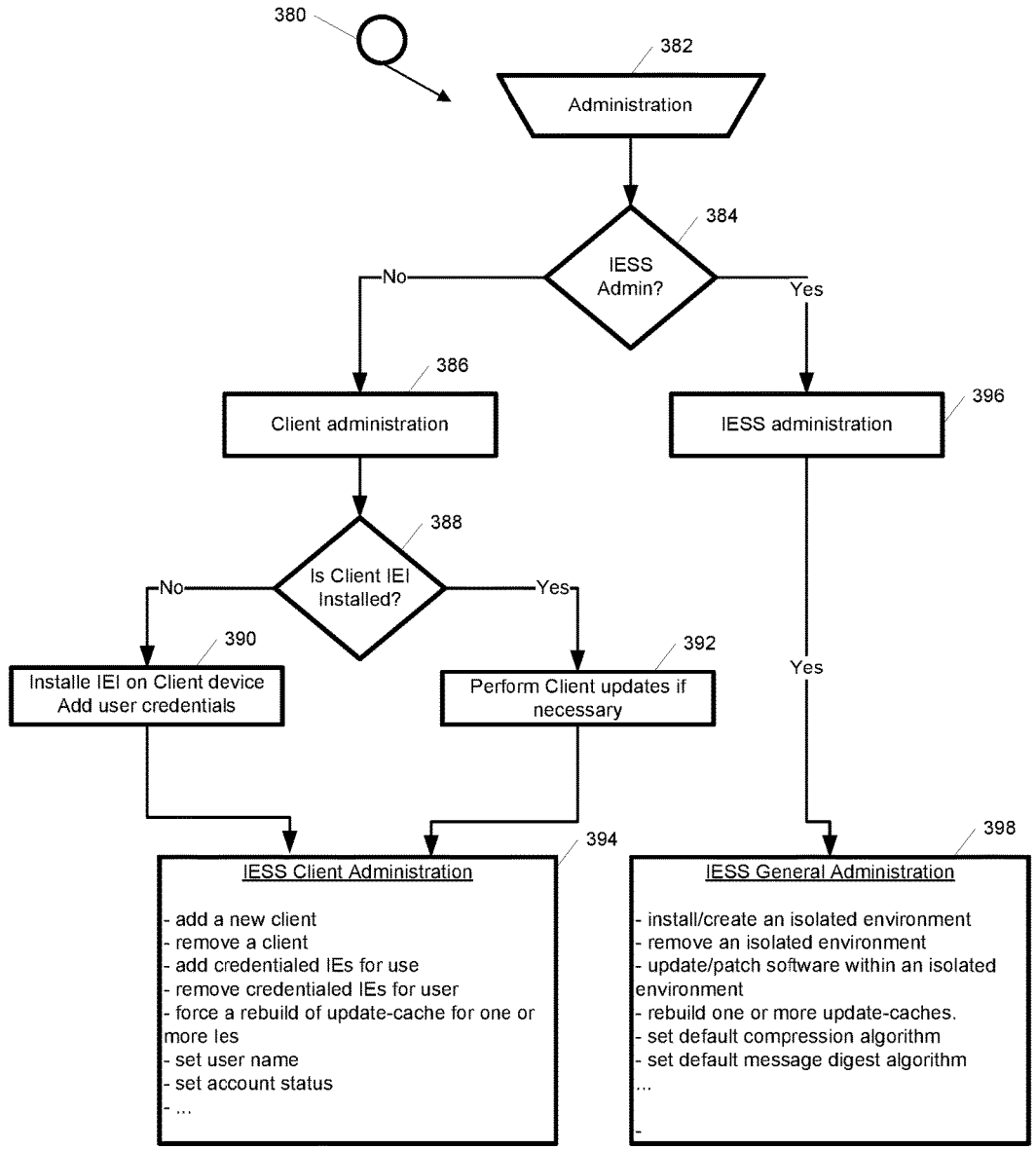
FIG.10 – Administration

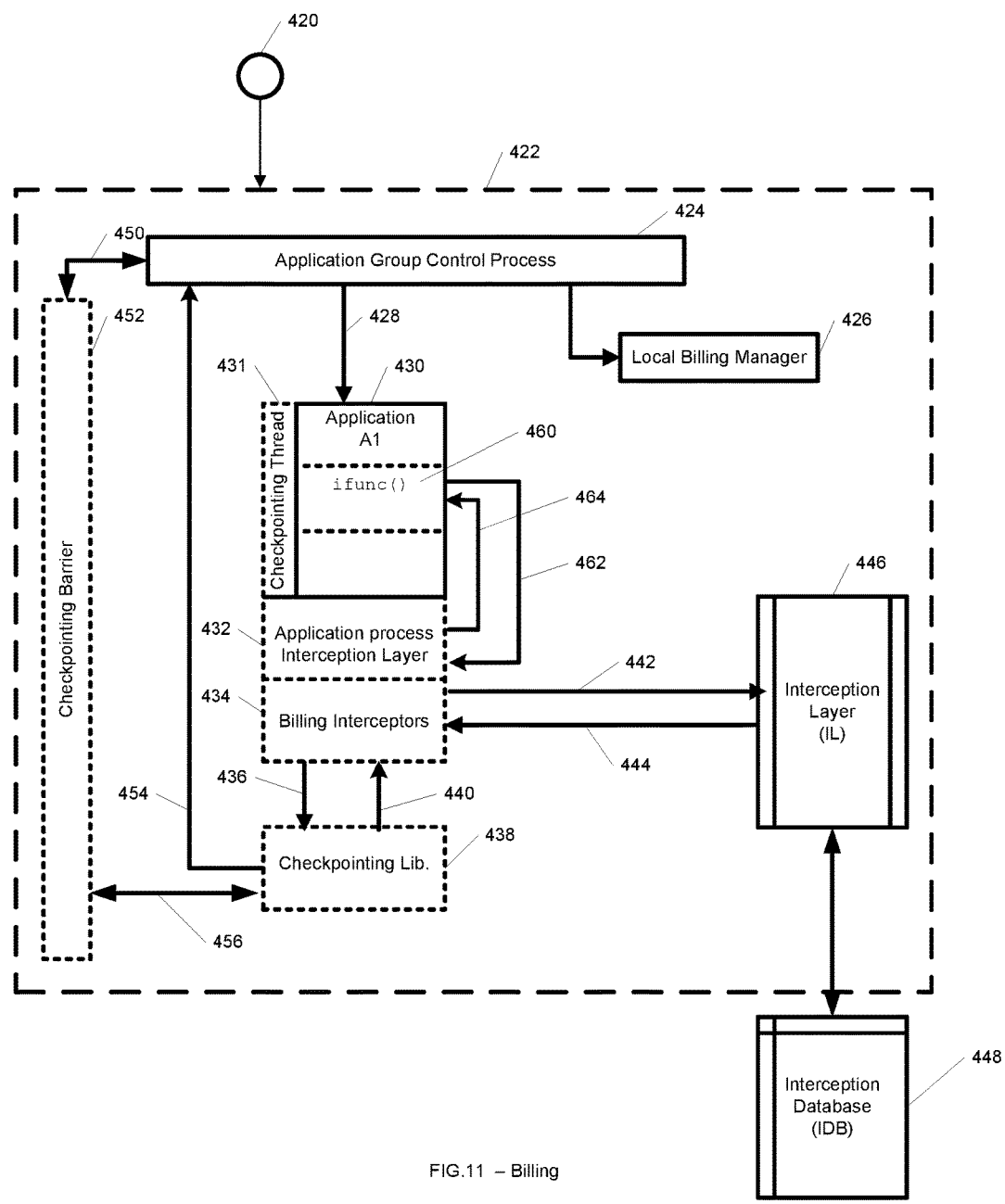
FIG.11 – Billing

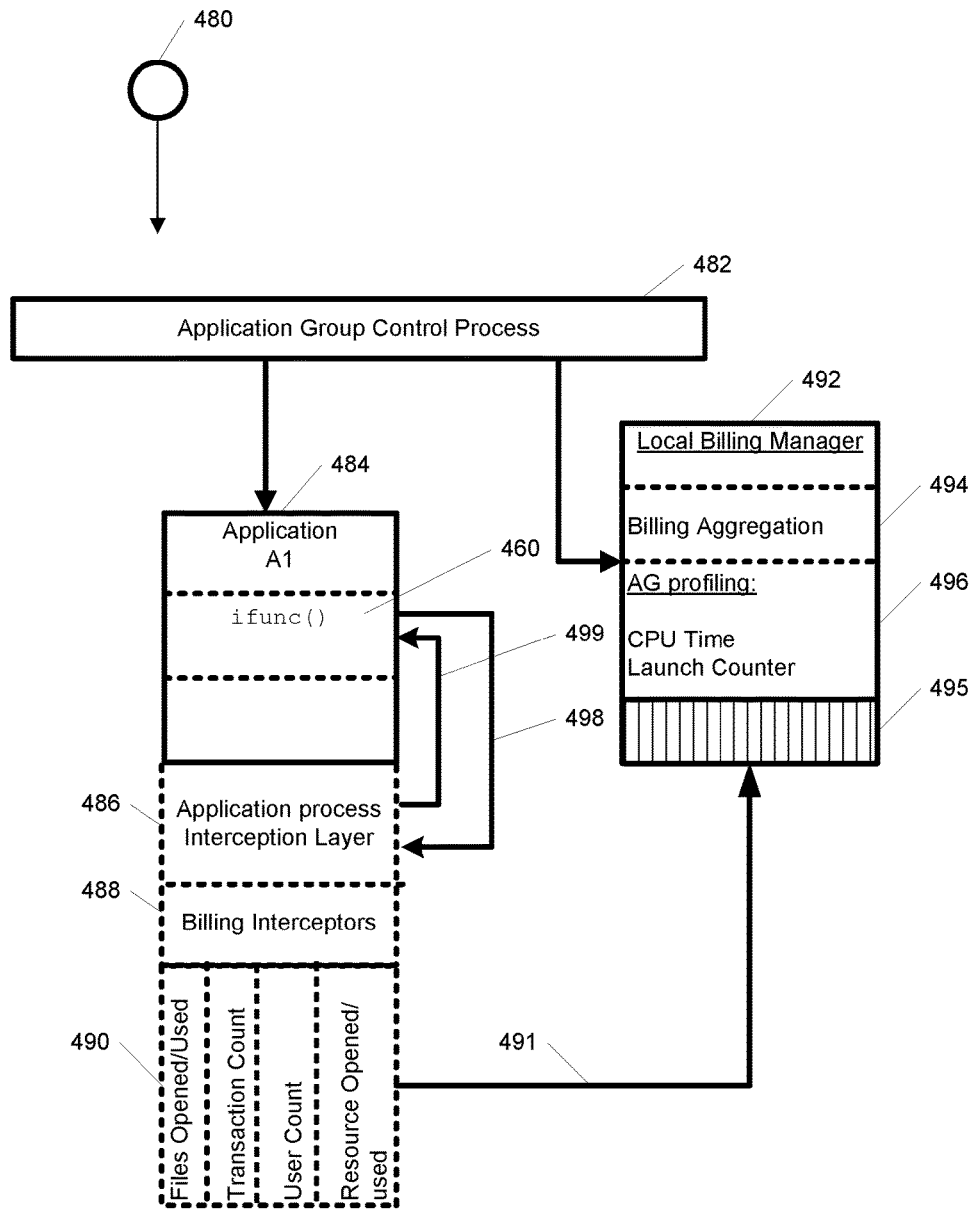
FIG.12 – Billing Manager

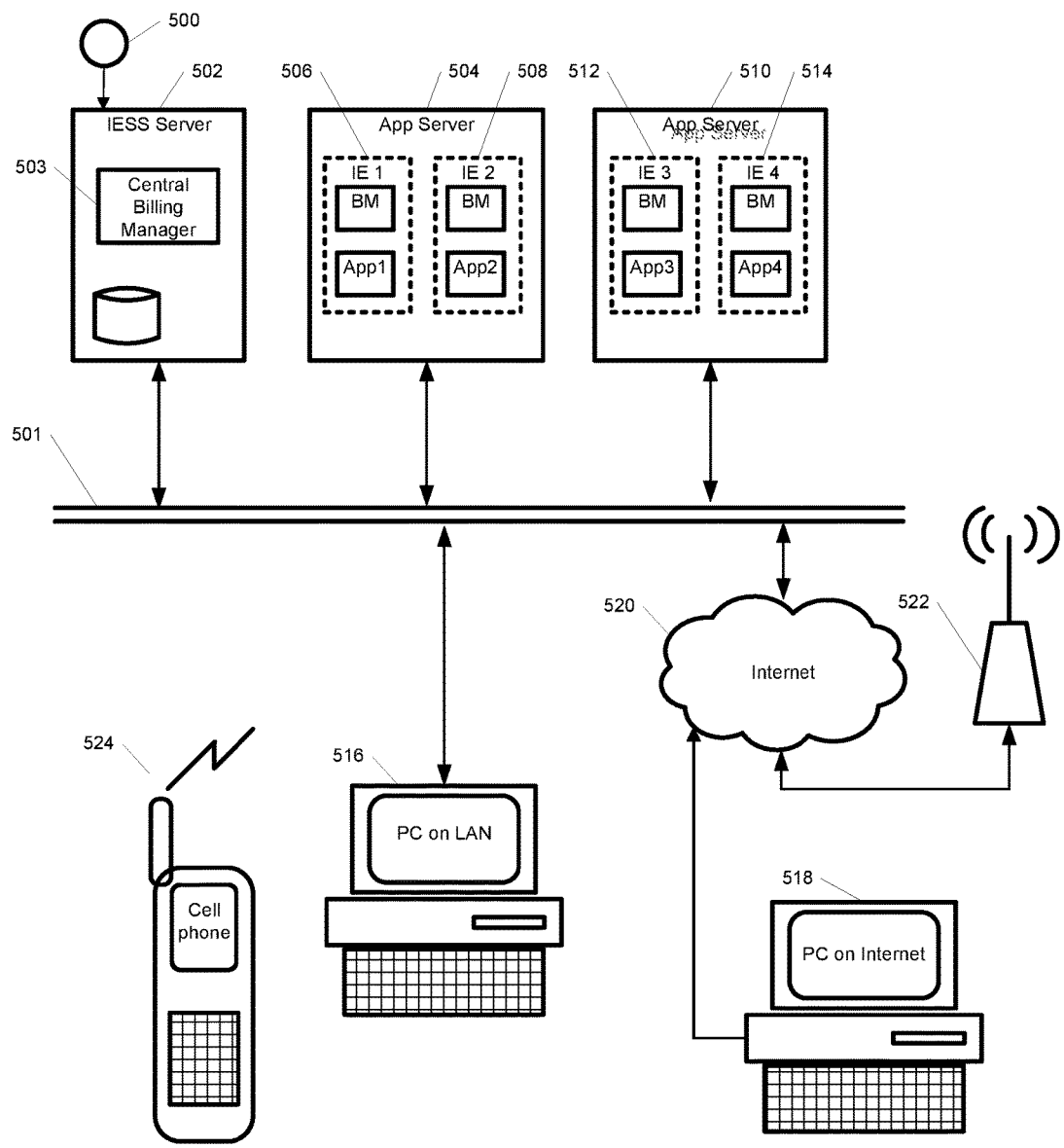
FIG.13 – Deployment Scenarios

SYSTEM AND METHOD FOR USAGE BILLING OF HOSTED APPLICATIONS

CROSS-REFERENCE TO RELATED APPLICATIONS

This application is a continuation and claims priority from U.S. application Ser. No. 14/720,804 filed on May 24, 2015 titled SYSTEM AND METHOD FOR USAGE BILLING OF HOSTED APPLICATIONS, now issued U.S. Pat. No. 9,563,883, issued Feb. 7, 2017, which is a continuation and claims priority from U.S. application Ser. No. 14/458,917 filed on Aug. 13, 2014 titled SYSTEM AND METHOD FOR USAGE BILLING OF HOSTED APPLICATIONS, now issued U.S. Pat. No. 9,058,600, issued Jun. 16, 2015, which is a continuation of U.S. application Ser. No. 14/159,884 filed on Jan. 21, 2014 titled SYSTEM AND METHOD FOR USAGE BILLING OF HOSTED APPLICATIONS, now issued U.S. Pat. No. 8,818,886 issued on Aug. 26, 2014, which is a continuation of U.S. application Ser. No. 13/844,853 filed on Mar. 16, 2013 titled SYSTEM AND METHOD FOR USAGE BILLING OF HOSTED APPLICATIONS, now issued U.S. Pat. No. 8,639,599 issued on Jan. 28, 2014, which is a continuation of U.S. application Ser. No. 12/851,639 filed on Aug. 6, 2010 titled SYSTEM AND METHOD FOR USAGE BILLING OF HOSTED APPLICATIONS, now U.S. issued U.S. Pat. No. 8,401,940 issued on Mar. 19, 2013, which is a continuation-in part and claims priority from U.S. application Ser. No. 12/813,593 filed on Jun. 11, 2010 titled SYSTEM AND METHOD FOR APPLICATION ISOLATION WITH LIVE MIGRATION, now issued U.S. Pat. No. 8,539,488 issued on Sep. 17, 2013, which is a continuation-in-part of U.S. application Ser. No. 12/421,691 filed on Apr. 10, 2009 titled SYSTEM AND METHOD FOR APPLICATION ISOLATION, now issued U.S. Pat. No. 8,341,631 issued on Dec. 25, 2012, each of which are incorporated herein by reference in their entirety. This application is related to the following commonly assigned applications: U.S. patent application Ser. No. 12/813,618 filed on Jun. 11, 2010 titled SYSTEM AND METHOD FOR HIERARCHICAL INTERCEPTION WITH ISOLATED ENVIRONMENTS, now issued U.S. Pat. No. 8,464,256 issued on Jun. 11, 2013, is related to U.S. patent application Ser. No. 12/421,692 filed on Apr. 10, 2009 titled SYSTEM AND METHOD FOR APPLICATION ISOLATION, now issued U.S. Pat. No. 8,904,004 issued on Dec. 2, 2014, is related to U.S. patent application Ser. No. 12/421,694 filed on Apr. 10, 2009 titled SYSTEM AND METHOD FOR APPLICATION ISOLATION, now issued U.S. Pat. No. 8,782,670, issued on Jul. 15, 2014, is related to U.S. patent application Ser. No. 12/839,576 filed on Jul. 20, 2010 titled SYSTEM AND METHOD FOR STREAMING APPLICATION ISOLATION now issued U.S. Pat. No. 8,418,236 issued on Apr. 9, 2013, is related to U.S. patent application Ser. No. 12/839,610 filed on Jul. 20, 2010 titled SYSTEM AND METHOD FOR CACHED STREAMING APPLICATION ISOLATION, is related to U.S. patent application Ser. No. 12/839,673 filed on Jul. 20, 2010 titled SYSTEM AND METHOD FOR ON-LINE AND OFF-LINE STREAMING APPLICATION ISOLATION now issued U.S. Pat. No. 8,555,360 issued on Oct. 8, 2013, each of which are incorporated herein by reference in their entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to enterprise computer systems, computer networks, embedded computer systems, wireless devices such as cell phones and PDAs, computer systems, and more particularly to methods, systems and procedures (i.e., programming) for providing application isolation for multiple applications running on a host operating system and for providing usage billing for applications running within the isolated environments. The invention further provides application usage billing for applications running within a "cloud computing" or "hosted environment" with or without isolated environments.

2. Description of Related Art

In many environments one of the most important features is to ensure that one running application doesn't affect other running applications, and that the crash of one application doesn't compromise other running applications. In many environments applications share system resources, libraries and hardware, which expose subtle interconnects between seemingly unrelated applications.

Several approaches have been developed addressing this fundamental problem. The first level of application isolation is provided by the operating system. Modern operating systems such as Linux, UNIX, Windows2000, NT, XP and Vista provide some level of application isolation through the use of processes, and the underlying hardware memory management unit. The use of processes generally ensure than one running application process cannot address memory owned by other processes. This first level of isolation does not address the use of shared resources, such as files, file systems, shared memory, and libraries, so other approaches have been developed.

The present invention builds on the teachings in U.S. application Ser. No. 12/813,593 wherein Havemose teaches "SYSTEM AND METHOD FOR APPLICATION ISOLATION WITH LIVE MIGRATION", and U.S. application Ser. No. 12/813,618 wherein Havemose teaches "SYSTEM AND METHOD FOR HIERARCHICAL INTERCEPTION WITH ISOLATED ENVIRONMENTS" collectively identified as "Havemose" throughout the disclosures. Havemose discloses system and methods for creating and maintaining isolated environments wherein applications can be installed and run without interfering with any other applications on the host system. Havemose further discloses system and methods for creating isolated environments and for the use of pre-created isolated environment as "installation-free" images that can run on a client without requiring direct application installation on the client, and systems for hierarchical interception. Havemose teaches an approach that works on commodity operating system using off-the-shelf applications. Havemose was incorporated herein by reference in its entirety above.

In a "Cloud computing" environment, where resources and applications are dynamically assigned and accessed remotely a related challenge is one of charging for the use of the application. Historically, applications were purchased by a corporation, installed in the company's datacenter and managed by in-house IT staff. With the shift to cloud computing, the applications are hosted somewhere in the internet "cloud" and accessed remotely. The actual end-user or the end-user's IT group are typically not responsible for installing, hosting, and maintaining the application.

A variety of approaches have been designed to manage billing for application use. Historically software was purchased and paid for once and keep updated using an annual maintenance contract. With the move to hosted applications, the hosting provider needs a flexible way to do "usage billing" where the user pays based on actual use patterns. Existing billing-mechanisms are often either fixed one-time licenses as just described, or require custom applications, custom operating systems, or custom hardware.

In U.S. Pat. No. 5,047,928 and U.S. Pat. No. 5,155,680 Wiedmer teach "Billing System for Computer Software" and "Billing System for Computing Software" respectively. The teachings rely on a combination of algorithms and custom hardware security and billing modules. The billing modules are replaced periodically and the billing information is read from the billing module. In a typical cloud environment requiring custom hardware and replacement of modules to do billing is impractical and not well suited to hosting in a datacenter. Furthermore the teachings do not address usage billing.

In U.S. Pat. No. 5,235,290 Cauffman et al teach "Billing System with Data Indexing". The teachings describe a pre-processing mechanism to facilitate display, under the control of a service customer, for services rendered to a customer. The teachings do not disclose steps for collection of usage billing information or the use in a cloud computing environment, only a pre-processing step for displaying the results.

In U.S. Pat. No. 5,386,369 Christiano teach "License Metering System for Software Applications". The teachings rely on a hardware dongle as "metering device" and disclose various techniques to ensure that the application metering data is accurately stored, and cannot easily be lost due to hardware failures. The teachings do not address the actual metering mechanics, the use within the context of cloud computing or application isolation.

In U.S. Pat. No. 5,708,709 Rose teach "System and Method of managing try-and-buy usage of application programs". The teachings focus on ensuring that a user only can run applications properly licensed using a combination of encryption and verification. The teachings do not address collecting usage billing information or application isolation.

Therefore, in many systems, providing usage billing of hosted applications requires one or more of customized operating systems, customized applications, and proprietary billing infrastructure Furthermore, the above cited references do not include or address application isolation. Hence, there is a need for systems and methods that combine application isolation with usage billing of hosted applications running on commodity operating systems such as Windows and Linux

BRIEF SUMMARY OF THE INVENTION

The present invention provides a system and methods for usage billing of one or more hosted applications. The one or more applications are pre-configured inside one or more isolated environment and the isolated environments are hosted on one or more central servers. The teachings of Havemose work on commodity operating systems, such as Windows and Linux, and work with standard "off the shelf" applications; no customizations of operating system or applications are required, and no virtual machines, virtual file system or any other proprietary protocols are needed. The isolated environments with said one of more applications are accessed remotely or locally and clients can run said one or more applications without ever performing a local installation. Usage billing information is collected for said one or more applications and collected and aggregated for billing purposes. In one embodiment an implementation in the Linux environment is disclosed, in another embodiment an implementation on Windows is disclosed. In yet another embodiment, an implementation of usage billing without isolated environments is disclosed.

Another aspect of the present invention is the fine granularity on which usage billing is provided. Examples include billing based on application time used, application memory used, number of open files, number of transactions, amount of air-time, and a variety of other metrics. Yet another aspect of the present invention is a flexible event driven billing aggregator providing summary billing information for each chosen event type.

Yet other aspects of the present invention are a two-way authentication subsystem and encryption of communication data. The streaming server is authenticated by clients before they accepting any streaming data, and clients likewise are authenticated against pre-defined credentials before the streaming servers delivers any isolated environments or updates.

A user of the client computer can run the application without needing to install or configure the application; the user runs the application as pre-configured and provided on the streaming server. The present teachings require no special virtual file systems, proprietary streaming protocols, or any other proprietary protocols.

DEFINITIONS

The terms "Windows" and "Microsoft Windows" is utilized herein interchangeably to designate any and all versions of the Microsoft Windows operating systems. By example, and not limitation, this includes Windows XP, Windows Server 2003, Windows NT, Windows Vista, Windows Server 2008, Windows 7, Windows Mobile, and Windows Embedded.

The terms "Linux" and "UNIX" is utilized herein to designate any and all variants of Linux and UNIX. By example, and not limitation, this includes RedHat Linux, Suse Linux, Ubuntu Linux, HPUX (HP UNIX), and Solaris (Sun UNIX).

The term "node" and "host" are utilized herein interchangeably to designate one or more processors running a single instance of an operating system. A virtual machine, such as VMWare, KVM, or XEN VM instance, is also considered a "node". Using VM technology, it is possible to have multiple nodes on one physical server.

The terms "application" is utilized to designate a grouping of one or more processes, where each process can consist of one or more threads. Operating systems generally launch an application by creating the application's initial process and letting that initial process run/execute. In the following teachings we often identify the application at launch time with that initial process.

The term "application group" is utilized to designate a grouping of one or more applications.

In the following we use commonly known terms including but not limited to "client", "server", "API", "java", "process", "process ID (PID)", "thread", "thread ID (TID)", "thread local storage (TLS)", "instruction pointer", "stack", "kernel", "kernel module", "loadable kernel module", "heap", "stack", "files", "disk", "CPU", "CPU registers", "storage", "memory", "memory segments", "address space", "semaphore", "loader", "system loader", "system path", "sockets", "TCP/IP", "http", "ftp", "Inter-process communication(IPC), "Asynchronous Procedure Calls (APC), "POSIX"," and "signal". These terms are well known in the art and thus will not be described in detail herein.

In the following we use commonly known terms from computer security and encryption including, but not limited to "certificate", "certificate authority", "Secure Socket Layer", "SSL", MD-5", "MD-6", "Message Digest", "SHA", "Secure Hash Algorithm", "NSA", "NIST", "private key", "public key", "key pair", and "hash collision". These terms are well known in the art and thus will not be described in detailed herein.

The term "transport" is utilized to designate the connection, mechanism and/or protocols used for communicating across the distributed application. Examples of transport include TCP/IP, Message Passing Interface (MPI), Myrinet, Fibre Channel, ATM, shared memory, DMA, RDMA, system buses, and custom backplanes. In the following, the term "transport driver" is utilized to designate the implementation of the transport. By way of example, the transport driver for TCP/IP would be the local TCP/IP stack running on the host.

The term "interception" is used to designate the mechanism by which an application re-directs a system call or library call to a new implementation. On Linux and other UNIX variants interception is generally achieved by a combination of LD_PRELOAD, wrapper functions, identically named functions resolved earlier in the load process, and changes to the kernel sys call table. On Windows, interception can be achieved by modifying a process' Import Address Table and creating Trampoline functions, as documented by "Detours: Binary Interception of Win32 Functions" by Galen Hunt and Doug Brubacher, Microsoft Research July 1999". Throughout the rest of this document we use the term interception to designate the functionality across all operating systems.

The term "file context" or "context" is used in relation with file operations to designate all relevant file information. By way of example, and not limitation, this includes file name, directory, read/write/append/execute attributes, buffers and other relevant data as required by the operating system.

The term "transparent" is used herein to designate that no modification to the application is required. In other words, the present invention works directly on the application binary without needing any application customization, source code modifications, recompilation, re-linking, special installation, custom agents, or other extensions.

The terms "private and isolated environment" and "isolated environment IE)" are used herein interchangeably to designate the private area set aside for application isolation, as described in Havemose. The abbreviation IE is used to designate an isolated environment on the diagrams and throughout the text.

The Term "Isolated Environment Infrastructure (IEI)" is used herein to designate the entire isolated environment infrastructure as disclosed in Havemose. It's comprised of shared libraries, a series of interceptors and other configuration information is described in the cited reference. Details of IEI will not be further described herein.

The terms "Cloud Computing", "Software as a service (SaaS)", "Utility Computing", and "Hosted Applications" are used herein interchangeably to designate a deployment model where applications are hosted centrally, often off-site, and accessed remotely. Typically, the applications are hosted and managed by an independent company and the end-user pays to access the software services.

The term "usage billing" is used herein to designate that the user of an applications pays to use the application based on one or more metrics. Possible metrics include, but are not limited to: time used, storage used, number of open files, number of records in a database, and number of times the application has been launched.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL

Views of the Drawing(s)

The invention will be more fully understood by reference to the following drawings which are for illustrative purposes only:

FIG. 1 is a block diagram of the core system architecture showing three clients and the IE Streaming Server FIG. 2 is a block diagram illustrating the Isolated Environment Streaming Server FIG. 3 is a block diagram illustrating Client Systems FIG. 4 is a block diagram illustrating establishing a secure and credentialed connection between a client and the IESS FIG. 5 is a block diagram illustrating establishing client credentials FIG. 6 is a block diagram illustrating creating the list of credentialed IEs for a client FIG. 7. is a block diagram illustrating the client policy manager FIG. 8. is a block diagram illustrating client synchronization against the IESS FIG. 9 is a block diagram illustrating client operation in off-line and on-line modes FIG. 10 is a block diagram illustrating administration FIG. 11 is a block diagram illustrating the billing FIG. 12 is a block diagram illustrating the local billing manager FIG. 13 is a block diagram illustrating various deployment scenarios and the central billing manager

DETAILED DESCRIPTION OF THE INVENTION

Referring more specifically to the drawings, for illustrative purposes the present invention will be disclosed in relation to FIG. 1 through FIG. 13. It will be appreciated that the system and apparatus of the invention may vary as to configuration and as to details of the constituent components, and that the method may vary as to the specific steps and sequence, without departing from the basic concepts as disclosed herein.

0. Introduction

The context in which this invention is disclosed is one or more applications installed inside isolated environments and hosted on an "Isolated Environment Streaming Server (IESS)" with the isolated environments being streamed to one or more clients. The Havemose reference cited above, included in its entirety by reference, teaches the creation and maintenance of the isolated environments. Usage billing information is collected by the Isolated Environment Infrastructure (WI) present on all clients, and aggregated by a billing manager system. Without affecting the general case of multiple applications, the following scenarios often depict and describe one or two applications as applicable. Multiple applications are handled in a similar manner. Similarly the following scenarios often depict one or two clients; multiple clients are handled in a similar manner. Similarly, the following scenarios often depict one isolated environment per client; multiple isolated environments are handled in a similar manner. Similarly, the following scenarios often depict one IESS; multiple IESSes are handled in a similar manner. The term "client" is used only to designate that it's the recipient of the isolated environments steamed from the IESS. By way of example, the "client" may be a desktop workstation, a server in a data center, or a virtual machine hosted on some other server 1. Overview FIG. 1 illustrates by way of example embodiment 1 the overall structure of the present invention. The following brief overview illustrates the high-level relationship between the various components; further details on the inner workings and interdependencies are provided in the following sections. FIG. 1. Illustrates by way of example embodiment three client systems 10, 20, 30 and the Isolated Environment Streaming Server (IESS) 40. The client systems contain isolated environments (IE) and the "Client Credentials (CC)" governing the IESS access privileges for the particular client on the IESS. Also present on each client is the core Isolated Environment Infrastructure (IEI) and operating system and libraries. Specifically, Client-1 10 contains isolated environment IE-1 12 with update-cache 13 and client credentials (CC) 18, Isolated Environment Infrastructure (IEI) 14 and operating system and libraries 16. Client-2 20 contains IE-2 22 with update-cache 23 and CC 28, LEI 24 and operating system and libraries 26, while Client-3 30 contains IE-3 32 with update-cache 33 and CC 38, IEI 34 and operating system and libraries 36.

Each client connects to the IESS 40 via the Client Policy Manager (CPM) 42. The CPM validates the credentials and maintains an Account for each credentialed client. Associated with each Client Account is an update-cache used to optimize access to isolated environments enabled for the particular client. Each client has one update-cache per credentialed IE. If a client account has access to two IEs, there are thus two update-caches for that particular client.

FIG. 1 illustrates by way of example the Client Policy Manager (CPM) 42 with three client accounts: Account Client-1 44 with associated update-caches 46, Account Client-2 48 with associated update-cache 50, and Account Client-3 52 with associated update-cache 54. By way of example, Client 1 is credentialed to use isolated environment IE-1 56 and IE-2 58 and therefore has two update-caches 46, while Client 2 is credentialed to use isolated environment 2 IE-2 58, and Client 3 is credentialed to use isolated environment 'n' 62.

It is readily apparent to someone skilled in the art that the architecture extends to any number of clients, any number of isolated environments on any one client, and to any number of pre-configured isolated environments on the IESS.

2. IE Streaming Server (IESS)

FIG. 2 illustrate by way of example embodiment 80, the key functional elements of the Isolated Environment Streaming Server IESS 82. The following brief overview only illustrate the key components, further details are given below. Loaded in memory 84 are the Client Policy Manager (CPM) 86 and the accounts and update-caches for active clients 90. The isolated environments 92 available for streaming to client are loaded from either local disk 100 or networked storage 102, and delivered to clients over the network 104 as determined by the update-caches 90

System resources, such as CPUs 98, I/O devices 96, Network interfaces 94 and storage 100, 102 are accessed using the operating system 88. Devices accessing remote resources use some form of transport network 104. By way of example, system networking 104 may use TCP/IP over Ethernet transport, Storage 100, 102 may use Fibre Channel or Ethernet transport, and I/O may use USB.

3. Client Architecture

FIG. 3 illustrate by way of example embodiment 120, the key functional elements of a client system 122 within the context of the present invention. The following brief overview only illustrates the key components; further details are given below. Loaded in memory 124 are the applications within the isolated environments, IE-A 130 with update-cache 131, IE-B 132 with update-cache 133, and the Client Credentials 134. The core Isolated Environment Infrastructure (IEI) as defined above and in Havemose, is also loaded in memory.

System resources, such as CPUs 142, I/O devices 140, Network interfaces 138 and storage 136 are accessed using the operating system 128. Devices accessing remote resources use some form of transport network 144. By way of example, system networking 144 may use TCP/IP over Ethernet transport, Storage 136 may use Fibre Channel or Ethernet transport, and I/O 140 may use USB.

4. IE Stream Server Credentials and Secure Communication

To ensure secure and private communication the IESS most be properly credentialed. By way of example, if personnel in HR want to interact with the payroll system on the IESS and upload payroll information, the client system used by the HR employee validates the credentials of the IESS before uploading sensitive payroll information. If the IESS credential validation fails, the client system disconnects and stops interacting with the IESS.

A related issue is security; ensuring that no malware of spyware gets downloaded into the clients isolated environments. By requiring a credentialed IESS, there a no risks of connecting to a malware site by mistake as such connections would be refused by the isolated environment infrastructure without establishing any connection beyond the initial attempt to validate credentials.

Full IESS credentials are provided by a standard SSL certificate issued by either a certificate authority or generated in-house. If the IESS is accessed over the internet, a preferred implementation uses a certificate issued by a Certificate Authority. If the IESS only is accessed via a private LAN, WAN or VPN, an in-house generated certificate would suffice, but a certificates issued by a Certificate Authority equally works.

The present invention establishes the initial secure communication using Secure Sockets Layer (SSL), a standardized technology widely available in modern operating systems such as Windows and Linux. Open source implementations of SSL include OpenSSL (www.openssl.org).

FIG. 4 illustrates by way of example embodiment 160 the initial steps needed to set up secure communication between a client and an IESS.

First a certificate for the IESS is generated. Generation of the IESS certificate only is needed when creating a new certificate, or when a certificate has expired. Generally, a certificate is valid for one or more years if generated by a certificate authority. First a private and public key pair is generated 164. This is accomplished using commonly available tools, such as 'makekey' provided by OpenSSL. In a preferred implementation, the a certificate request is prepared ('certreq' in OpenSSL) with the public key and transmitted to the Certificate Authority 162 together with information confirming the senders identity. The Certificate Authority generates a certificate 168 and delivers it back to the originator 166 and the certificate is installed on the IESS. In an alternate implementation, the certificate is self-generated using one of the available tools, such as 'testreq' from OpenSSL. The certificate 168 is used to establish the credentials of the IESS by clients.

FIG. 4 further illustrates by way of example embodiment the establishment of secure and encrypted communication between a client 170 and the IESS.

The client initiates communication 174 with the IESS using SSL. In response to the initial contact, the IESS 172 accepts the request for the certificate 176 and delivers the certificate to the client. The client validates the certificate 180. Validation can take one of two forms: in a preferred implementation the certificate is compared against a local copy provided by the administrator as part of present invention, in an alternate implementation the certificate is validated against known and pre-approved certificate authorities. Modern operating systems, such as Linux and Windows, provide a mechanism to store pre-approved certificates. If the validation fails 182 the client disconnects 184 as the IESS is rogue, mis-configured, or has an invalid certificate. If the certificate validates 183, the client proceeds 186 and using SSL establishes secure and encrypted communication 188 with the IESS.

The client is now ready to have its client credentials validated 190 by the Client Policy Manager (CPM) within the IESS.

5. Validating Client Credentials with the Client Policy Manager

With possibly multiple isolated environments hosted on an IESS, proper authentication of clients is important. By way of example, if a particular isolated environment contains a payroll software application, only clients with the proper credentials (generally personnel in human resources) should have access to the payroll application. The Client Policy Manager (CPM) running on the IESS governs which clients have access to which isolated environment. The specific client privileges are set by the system administrator and are implemented by the CPM.

The connection between client and IESS, as describe above, is established using SSL, and is therefore secure and encrypted. The client only needs the client account as its credentials. All IEs available to a particular client are managed by the CPM and the key-pair needed for encryption is managed by SSL.

When a client wishes to use a particular application within an isolated environment; the client makes a request to the Client Policy Manager (CPM) for access to the requested IE. The CPM validates the client credentials at two levels: first the client is validated as having access to the IESS services, followed by validation of the client's credentials for the requested IE.

FIG. 5 illustrates by way of example embodiment 200 a client 202 making a request to run a particular IE. The CPM first validates 204 that the user has access to the IESS, by consulting its built-in database of approved clients 206. The result of the client validation by CPM is returned 207 to the client. If the client has invalid credentials 208, the session is terminated 224 and no further action is taken. If the client has valid credentials 210, the credentials to access the particular IE are validated 212. If the client is not credentialed to access the IE any future access attempts to the IE are eliminated 214. If the IE is installed on the client system, it is removed 218 and the session is terminated 224. If the IE is not installed on the client, the session terminates as there is no data or IE to remove. The IE is removed for reasons of security and access control: if a credentialed user has the rights to use a particular IE revoked, the possibility to run the IE must be removed. In continuation of the example, if the employee in the payroll department transfers to benefits, the employee is still credentialed, but should no longer have access to the payroll application.

If the client is credentialed to run the particular IE 216, the IE needs to be either installed or potentially updated. If the IE is not installed on the client 220, it is copied to the client environment, and the IESS update-caches are updated to reflect the current state of the client copy. If the IE already is installed on the client 222, the update-caches on IESS are queried and updates propagated as necessary. The caching and installation are described in more detail below.

When a client starts the present invention he is presented with a list of available IEs based on his credentials. FIG. 6 illustrates by way of example embodiment 240, a client obtaining the list of credentialed applications and launching a chosen application. First the client is credentialed 242 as described above. The client requests a list of credentialed IEs 244 and the CPM 246 responds with a list of IEs available and credentialed for the particular client. The list is presented to the client 250. In a preferred embodiment the client is presented with a graphical user interface 252 allowing the client to choose from a list of credentialed applications 254 and starting the application directly by clicking either on the application name 254 or OK 260. The launch can be cancelled by selecting "Cancel" 258. The client can also force a refresh 256 of available IEs, thereby updating the IE list 254. In a preferred embodiment the most recently chosen application is automatically highlighted. By way of example, FIG. 6 illustrates the scenario 254 with two credentialed applications ("Payroll" and "Benefits") and one application no longer credentialed ("Investor Relations"). By selecting "Off-line" 257 the user indicates no synchronization against the IESS and that the local already-installed IE should be run.

6. Client Policy Manager Architecture

The Client Policy Manager (CPM) within the IESS is the main contact point between clients and the IESS. The functionality of the CPM fall in several broad categories: 1) delivery of certificates to clients and establishment of SSL, 2) general client account access, 3) administration, and 4) management and implementation of the caching subsystem. FIG. 7 illustrates by way of example embodiment 240, the architectural blocks of the CPM 242.

6.1 Certificates and SSL:

As disclosed previously, the IESS is credentialed by clients using a SSL certificate. The certificate serves dual roles, as a mechanism for the clients to validate the identity of the IESS and by providing keys for secure encrypted communication over SSL. Referring to FIG. 7 for illustrative purposes, the IESS certificate interface 244 is responsible for responding to certificate requests and to deliver them. The SSL interface 246 is responsible for the IESS end of SSL. In modern operating systems SSL is in general pre-defined to use certain ports such as 443 and 442 for SSL certificates and https respectively. In a preferred implementation, the present invention uses different ports that the default ports to avoid conflicts with web browsing and to minimize attacks. In an alternate implementation, the standard ports are used.

6.2 General Account Access:

As previously disclosed, the CPM 242 provides a number of client services. Referring to FIG. 7 for illustrative purposes: The validation of clients 250 as disclosed in section 5, the enumeration of available IEs given the clients credentials 252 (section 5), and the general client account and credentials subsystem 254 containing an account database 255 with account info for each valid client account Associated with each client account 256 is a record in the account database 257 containing specific information about the account, and subsystems 258 for cache management 260 and billing/logging 262. Each client account record 257 in the database 255 contains at least the following fields:

Client login
Account Holder Name
Status of account
List of credentialed IEs

The "client login" is the "user-id" used to validate the client account, while the "account holder name", is the actual name of the person to which the account is assigned. The "status of account" indicates if the account is valid and credentialed. Finally, the database maintains a list of isolated environments to which the user is credentialed. This list is presented to the user when requesting Client IE enumeration 252 as disclosed in section 5.

Associated with the client account are also the caching subsystem 260 and the billing and logging subsystem 262.

6.3 Update-Cache Subsystem for Isolated Environments.

When a client requests access to a credentialed isolated environment, the IE is streamed in its entirety if not already present on the client system, or the client IE is selectively updated with changes as appropriate. In the following, the details on these steps are disclosed.

By way of example, a typical Microsoft Office 2003 installation consists of approximately 1800 files with a combined size of about 315 MB. Some of the largest files are Word at 12 MB, Excel at 10 MB and PowerPoint at 6 MB. On a typical 1 Gbit/sec corporate network a typical good transmission rate is about 100 MB/sec, but can be significantly less. A typical ADSL connection runs at 1.5 Mbit/sec or 150 kB/sec and can be less.

The one-time installation of the entire environment with Office 2003 therefore typically takes about 3.1 sec or longer over corporate network. Over ADSL the Office IE takes 35 min or longer. While the 3.5 seconds on the office network is acceptable, the 35 minutes for ADSL access is not practical. The present invention includes an update-caching subsystem ensuring that only changed files are streamed to the client, and furthermore, that the streaming is compressed when appropriate.

FIG. 7 illustrates by way of example embodiment the update-cache management and its relation to the isolated environments. For each client account 256 in the client database 255, the present invention manages 260 the IE update-caches. Each IE credentialed for a particular user, has an update-cache associated with it for that user. Referring to FIG. 7, for client 'm' IE-1 266 is streamed subject to its update-cache 264, while IE-2 270 is streamed subject to its update-cache 268. If a particular IE is used by multiple clients, each client account 256 maintains its own update-cache for the particular IE.

To reduce the need to stream files already present on the client computer an update-cache is employed for each IE. The update-cache contains pre-computed information assisting in quickly indentifying which files have changed since last time the IE was accessed; thereby reducing unnecessary streaming of IE files.

The update-cache for a particular IE is comprised of a list of records, called "CacheLine", where each record corresponds to one file within the isolated environment. The data structure for "CacheLine" in pseudo code:

```
Class CacheLine {
    String m_FileName;
    String m_Directory;
    Time m_LastChangeTime;
    long m_FileSize;
    int[MD_SIZE] m_MessageDigest;
    boolean m_CompressionOn;
    int m_MessageDigestAlgorithm;
    int m_CompressionAlgorithm;
};
```

The field "m_FileName" is the name of the file, and m_Directory the directory location of the file. The combination of "m_FileName" and "m_Directory" uniquely identifies the file. The field "m_LastChangeTime" is the time at which the particular file was most recently changed, updated or created, and "m_FileSize" is the size of the file.

To make the update-cache efficient, the present invention pre-computes a "m_MessageDigest" representing the file. The message digest is a 128 bit or longer integer calculated in a manner to ensure that two different files have different message digests. Message Digests are well known within the art. Commonly deployed digests are MD5 ("Message-Digest algorithm 5" of size 128 bit), MD6 (Message-Digest algorithm 6 with sizes up to 512 bits), and SHA-n (Secure Hash Algorithm 'n' with sizes up to 1024 bits). The message digest is used as part of the validation to see if a particular file should be streamed to the client. A practical issue is hash collision, where two different files produce the same hash value. SHA-2 has no known hash collisions and is the default in a preferred embodiment. To further reduce the risk of a hash-collision possibly affecting the update-caches, the size of the file (m_FileSize) and the time stamp of the most recent file change (m_LastChangeTime) are also used in the comparing against the update-cache.

All supported Message Digests Algorithms are predefined as integers and the one used encoded in the field 'm_MessageDigestAlgorithm".

Another field "m_CompressionOn" determines if compression is used for the particular file corresponding to the CacheLine. Depending on file size, network bandwidth and available CPU cycles, files may selectively be compressed prior to being streamed to the client. All supported compression algorithms are pre-defined as integers and the one used encoded in the field "m_CompressionAlgorithm". Compression algorithms are provided as part of modern operating systems such as Windows and Linux. In a preferred embodiment, the operating systems default compression algorithm is used. In an alternate embodiment a customized compression algorithm is used. A wide selection of open source and commercial no-loss compression algorithms exists, including but not limited to LZ, LZR, LZX, PKZIP, GZIP and ZIP. In a preferred embodiment, files are automatically compressed if the network operates at less than 1.5 mbit/sec and the file size is greater than 1 MB. In an alternate embodiment every file is compressed. In another alternate embodiment no files are compressed.

Creating and Updating the Update-Cache:

The Havemose reference cited above and included in its entirety, teach creation and updating of isolated environments. The IE's associated update-cache is generated after install/update as follows (in pseudo code)

For each file in the isolated environment
{
Identify CacheLine corresponding to file
or create a new CacheLine
Update CacheLine with
{
  FileName, m_Directory,
    m_LastChangeTime, m_FileSize
  Compute message digest:
    set m_MessageDigest
    set m_MessageDigestAlgorithm
  Compute if the file should be compressed:
    set m_CompressionOn
    set m_CompressionAlgorithm
}
Remove any CacheLine entries no longer used
}

When creating a new Isolated Environment and installing applications within the IE, all CacheLines in the update-cache are new. The above listed set of instructions thus creates the update-cache with all new elements.

By way of example, after applying a software patch, the update-cache needs to be updated. A software patch generally modifies, adds and removes files, and the update-cache is updated to reflect the changes. Referring to the pseudo code above: CacheLines corresponding to new files are added, CacheLines corresponding to modified files are recomputed and updated, and CacheLines corresponding to now-deleted files are removed. Files unaffected by the software patch are left unchanged in the update-cache. Similarly the update-caches are updated after a patch to the operating system.

Client Synchronization with the Update-Cache.—Optimized Streaming

Optimized streaming, where the fewest possible files are streamed from the IESS to a client requesting the use or update of a particular isolated environment, is achieved by using of the update-caches on both the client and the IESS FIG. 8 illustrates by way of example embodiment 280 the optimized streaming process. A client 282 with one IE 284 and its associated update cache 286 (named u-cache on the diagram) is connecting to the IESS with a CPM 288. The client account 290 within the account database contains, as previously disclosed, the account record 290 and the cache management 294 for the update-cache 296 associated with the client account 290 and the particular IE 298

To determine which files within the IE 298 on the IESS have been modified since the client last connected, the Cache Mgr 294 compares the client's u-cache 286 with the corresponding update-cache 296 on the IESS. The entire process is as follows:

Initially, the client and the IE are credentialed against the CPM as previously disclosed 300. The client 302 requests an update of the IE and transmits the client's u-cache to the CPMs cache mgr 304. The CacheMgr's traverses the update-cache one CacheLine at a time 306 and comparing against the u-cache received from the client 302. First test 308 is to see if the current CacheLine is present in the client's u-cache. If the CacheLine is not in the u-cache, it signifies a new file in the IE, and the file corresponding to the CacheLine is prepared to be transmitted to the client 312. If the CacheLine exists in the u-cache, a second test is performed. The second test 310 is to see if the CacheLine entry has been updated when compared to the corresponding u-cache CacheLine. If the IESS CacheLine indicates a change has been made, the file corresponding to the CacheLine is prepared to be transmitted 312 to the client. If the CacheLines are identical in the update cache and u-cache, no further steps on this CacheLine are necessary.

The second test 310 to see if two CacheLine Entries are identical is performed as follows: The client u-cache and the update-cache CacheLines are considered identical if all of the following are identical: m_FileName, m_Directory, m_LastChangeTime, m_FileSize, and m_MessageDigest. If one or more of said fields are different, the entry is deemed not too match.

The final step after identifying a file for transmittal to the client 312 is to test if the file should be compressed 314 per the field in the CacheLine. If the file is to be compressed 316, it's compressed 316 and transmitted 318. If compression is not activated, the file is transmitted 318.

Upon completing the comparison of the client's u-cache with the update-cache 304, the update-cache is sent to the client 320

On the client, all new files are received 322 and copied into the environment 324. Finally, the u-cache is replaced with the update-cache corresponding to the just-completed update 326. The final step is to synchronize the client's new u-cache against the client's IE and remove files no longer included in the u-cache 326. If the client immediately reconnected 300,302 the update process 304 would detect no new files and the update process would be instantaneous.

In continuation of the example above, a typical Microsoft Office security patch modifies few of the 1800 files in full installation of Office. By way of example, if 50 files are modified only those 50 files need to be streamed to the client, corresponding to less than 3% of the total installation. This reduces the ADLS update from 35 minutes to 1 minute, which is a practical delay to install a patch over a slower network.

7. Online and Off-Line Client Operation

The present invention supports two modes of operation: an "off-line" mode of operation where the client runs an already-installed isolated environment without connecting to the IESS, and an "on-line" mode where the client is fully validated and updates automatically are streamed.

By way of example, a user connects with the present invention while at the office, retrieves and updates all credentialed IEs and works with the applications within the IE as if they were locally installed. Later the user is travelling and loads the present invention again. This time the user selects the "off line" mode of operation. In stead of getting credentialed by the IESS, the user simply runs the applications within the already installed IEs. No updates are forced and no changes are streamed. The "off-line" mode allows the user to work without needing network access.

FIG. 6 illustrates by way of example embodiment the user-settings for off-line and on-line operation. If the user checks the "off-line" checkbox 257, the system defaults to off-line mode, while de-selecting the "off-line" checkbox leaves the present invention in on-line mode. Using the underlying operating system, it is easy to detect if there is a network connection available. By way of example this can be achieved by attempting to open an http: connection to a well known web site such as www.yahoo.com or www.whitehouse.gov and process any error messages. If no network connection is found, the IEI is set to "off-line" and the "off-line" checkbox is automatically set. Furthermore, if a network connection is found, but the IESS is unreachable, the off-line mode and the "off-line" checkbox are likewise automatically set.

FIG. 9 illustrates by way of example embodiment 340 the launch procedures for both off-line and on-line modes. The user starts the isolated environment 342 on the client computer. The IEI auto-detects network availability 344 followed by testing the outcome of the auto-detection 346. If no network is available, the IEI enters off-line mode 348 and presents the user with already credentialed IEs available to run 350. The user chooses an IE 351 (also FIG. 6 252) and runs the chosen IE. When finished, the IE terminates 352.

If the network is available on-line mode is enabled 354 and the user can choose to operate in on-line or off-line mode 356. If the user chooses off-line, the user is presented with the list of already credentialed IEs 350 available to run 351. The user chooses an IE 351 and the IE is run. If the user chooses to proceed in on-line mode, the steps outlined in section 5 and FIG. 5 are followed 358, 360. Upon finishing, the IEI exits the IE 352

8. Administration

The present invention provides administration for both clients and the IESS. Administration on the client is a matter of installing the IEI and the user account name; all other administrative options are contained and controlled on the IESS.

FIG. 10 illustrates by way of example embodiment 380 a flow chart of the various administrative options. Administration 382 falls in two broad categories: administration of settings related to a particular user and administrative settings related to all isolated environments. First step is to choose 384 between administration of client settings and the general IESS settings. For client administration 386. If the IEI is not installed on the client device 388, it is installed and the user account info is provided 390. If the client IEI is installed, any updates to the IEI infrastructure is performed 392. This is followed for both cases by general client account administration 394. All information provided in this step is stored in the record for the particular account. For a particular client the administrative options include but are not limited to:
  1. add a new client
  2. remove an existing client
  2. add credentialed IEs for use by the client
  3. remove credentialed IEs for use by the client
  4. force a rebuild of update-cache for one or more of the clients IEs
  5. set client login, and account holder name
  6. set status of account (active, not active)

The account information govern the client credentialing processed disclosed above For general IESS administration 396 the administrative options 398 include but are not limited to:
  1. creation and installation of an isolated environment
  2. removal of an isolated environment
  3. updated/patch software within an isolated environment
  4. rebuild one or more of the update-caches
  5. set the default compression algorithm
  6. set the default message digest algorithm In a preferred embodiment the administration is performed using a graphical user interface. In an alternate embodiment, as software application programming interface (API) is used.

9 Usage Billing Overview

The Havemose disclosures, included in their entirety by reference, teach layered interception for multi-process multi-threaded application groups. The following disclosures build on said layered interceptions system and methods to add fine-grained usage billing FIG. 11 illustrates by way of example embodiment 420 an application group 422 and the integration of the billing subsystem. The billing subsystem is comprised of a local billing manager 426 and billing interceptors 434. FIG. 11 is carried over from the Havemose FIG. 11 and updated with the new billing components. The following disclosures focus on the new billing elements and any changes in control and data flow.

By way of example, the application group 422 consists of one application A1 430. Multiple applications are handled in a similar manner. The Application Group Control Process (AGCP) 424 launches 428 Application A1 430 and launches the local Billing Manager 426. The AGCP 424 loads 450 the barrier 452 for the application group. As part of the load process, the AGCP 424 preloads the interceptors 432, including the Interception Layer (IL) 446, for each application process, the billing interceptors 434 and the checkpointer library 438 for each application process. The application process interception layer 432, the billing interceptors 434 and the checkpointing library 438 are shared libraries and pre-loaded together. In an alternate implementation, the application process interception layer 432, the billing interceptors 434, and the checkpointing library 438 are combined into one shared library. All libraries operate within the address space of the application process where they were loaded.

FIG. 11 illustrates by way of example an Application A1 430 with one process and one corresponding application interception layer 432, one billing interceptor 434, and one checkpointing library 438. Multiple processes are handled in a similar manner with each process having a corresponding application process interception layer, billing interceptor, and checkpointing library. As taught in Havemose, the Interception Layer for an application is comprised of the individual application process interception layers. To distinguish between interception inside the application process interception layer 432 and the resource re-mapping functionality managed by the interception layer, the Interception Layer 446 is depicted separately on the diagrams. In the preferred implementation, the resource remapping functionality within IL 446 is embedded within the application process interception layer 432 and is executed after the checkpointing interceptors return 440 to the application process interception layer 432.

As part of loading and initializing the application A1, AGCP 424 further creates a dedicated checkpointing thread for each process in the application group. FIG. 11 illustrates by way of example a one-process application A1 with one corresponding checkpointing thread 431. Multi-process applications are handled in a similar manner with one checkpointing thread created per process. As processes are created and terminated, checkpointing threads are added and removed as necessary as disclosed in Havemose. As part of initializing the checkpointing library 438, the checkpointing library registers 456 the current process with the checkpoint barrier 452 The registration ensures that the current thread and process is included in the barrier, and ensures that the current process' checkpoint thread 431 is called as part of the barrier The billing interceptor 434 run within the address space of the application process 430 and are automatically included in the checkpoints.

The Interception database IDB 448 is global to all application groups within the isolated environment. If the IDB 448 has not been loaded, the AGCP 424 launches the IDB 448 prior to the performing the load process disclosed above.

The checkpointer, billing interceptors and the isolated environment all need access to all intercepted functions. In general, the checkpointer operates on the running application and utilizes interception to capture resource and their usage. The isolated environment utilizes the interception to re-direct resource usage to the isolated environment, and the billing interceptors add billing counters to a variety of system calls. By way of example, and not limitation, when application A1 430 reaches function ifunc( ) 460, which is subject the interception, the function ifunc( ) 460 is intercepted 462 and re-directed to the application process interception library 432. At this point ifunc( ) its context and parameters reflects the actual running application process. The intercepted call is first processed by the billing interceptor 434, then forwarded 436 to the checkpointing library 438, where all relevant stack information is saved. If ifunc( ) changes the process hierarchy, the change is communicated 454 to AGCP 284 in order to have AGCP 424 preload or remove the interceptors as previously disclosed. Control is then returned 440 to the application process interception layer 432. The application process interception layer calls 442 to the Interception Layer (IL) 446. The IL 446 remaps resources using the Interception Database 448 as disclosed in Havemose. Adjusted resources or data are returned 444 to the interceptor and sent back 464 to the calling application process via the return of ifunc( ).

10. Usage Billing Details

Usage billing requires sampling and monitoring of application group execution. By way of example, an application user may be billed based on one or more of amount of CPU time used by the application, amount of resources required, number of open files, number of concurrent users, number of transactions, number of processes, and the number of time the application has been run.

The billing interceptors 434 run as part of the application group's application processes and are only activated when an intercepted function is called. This makes the billing interceptors especially efficient for capturing data related to resource usage, transactions or any other activity triggered by the application. FIG. 12 illustrates by way of example embodiment 480 this in detail. Continuing with the example embodiment from FIG. 11 but reducing it to the essential elements related to the billing subsystem, the AGCP 482 launches the application A1 484 and the local billing manager 492. The interceptors consists of the application process interception layer 486 and the billing interceptors 488.

The billing interceptors 488 are broken down into one or more sub-groups 490. Example sub-groups include but are not limited to "files opened/used", "transaction count", "user count", and "resources used/opened". By way of example, the "files opened/used" interceptor intercepts all calls that open files, such as open( ) and fopen( ) and increments counters each time a new file is opened.

The interceptor keeps track of the billing information using a data structure. Example data structure in pseudo code Class BillingEvent

{

Int m_InterceptorID;
BigInteger m_UseCount;
BigInteger m_DataAmount;

}

Where BigInteger designates an arbitrary precision integer data type. Such are provided in Java by BigInteger and the equivalent classes and libraries in C and C++. All that is required is that they can fully represent m_UseCount and m_DataAmount. The m_InterceptorID is an integer assigned to each interceptor at development time enabling the Local Billing Manager to determine which interceptor generated a certain billing event.

By way of example, if the application A1 484 executes the following code:

int main(void)

{ char const *pStr="small text";
FILE *fp=fopen("/home/user/newfile.txt", "w")
if (fp !=null)
   fwrite(pStr,strlen(pStr),1,fp);
fclose(fp)

}

The billing interceptor 490 for fopen( ) would increment its m_UseCount counter by one indicating the use of a file, and the interceptor for fwrite( ) would increment its m_UseCount by one and it's m_DataUsed by "strlen(pStr)*1" bytes, corresponding to the number of bytes written. Other function interceptors work in a similar manner.

Upon completing the interception the interceptor forwards 491 the BillingEvent to the Local Billing Manager's 492 "Pending Billing Events" message buffer 495. In a preferred embodiment the BillingEvent is forwarded using sockets. In an alternate embodiment named pipes are used. In yet another alternate embodiment IPC is used.

FIG. 12 illustrates by way of example embodiment 491 the local billing manager and its components. The billing manager 491 is comprised of the billing aggregation subsystem 494, the profiling for the application group 496, and the "pending billing events" message buffer 495. Certain types of application measurement, such as amount of CPU time and memory usage are measured on an ongoing basis independent of the billing interceptors. The AG profiling system 496 measures the amount of CPU time used by each of the processes of the application group By way of example, the amount of CPU time taken by a process may be determined using the POSIX function times( ). The profiling subsystem 496 builds a BillingEvent with a pre-designated m_InterceptorID, and places it in the pending billing events message buffer 495 for processing by the Billing Aggregation subsystem. In the preferred embodiment where the billing interceptors 490 communicate with the local billing manager 492 using sockets, the pending billing events message buffer 495 is the buffer provided by the listening socket. In the alternate implementation where the messaging use named pipes, there is one named pipe for communication from the billing interceptors 490 and another named pipe for communication from the AG profiling 496. The figures and text describes one pending billing event message buffer, but it is understood that depending on implementation there may be more than one. The following example embodiments continue to describe the event processing using one buffer. Multiple buffers are handled in a similar manner with the same algorithm.

The Billing aggregation subsystem 494 process all incoming BillingEvents and keeps a running total for each m_InterceptorID. The billing aggregator 494 maintains an array of all Billing Events and updates the array as new BillingEvents come in. The Billing Aggregation 494 is described by the following pseudo code:

Initialize BillingEventArray and
set all counters to zero.
Wait for (events in pending BillingEvent buffer)
{
Remove BillingEvent from incoming buffer
Find element in BillingEventArray
with m_InterceptionID equal to the
BillingEvent. m_InterceptorID
Update said BillingEventArray element with
data from BillingEvent
}

At all times the Billing Aggregation 494 has, subject to processing of pending incoming Billing Events 495, an up-to-date view of billable events and thus has all the data to generate true usage-based billing.

If an isolated environment contains multiple applications, there is one application group control process for each application and each AGCP launches its own Local Billing Manager.

11. Aggregation of Usage-Billing Data Across Multiple Isolated Environments

The teachings so far cover collection of usage billing information within an isolated environment using a combination of interception and profiling. The local billing manager within each isolated environments communicate the usage billing information to a Central Billing Manager, responsible for aggregation across all running isolated environments and applications.

FIG. 13 illustrates by way of example embodiment 500 the aggregation of billing data across multiple applications and isolated environments. By way of example, and not limitation, the Central Billing Manager (CBM) 503 is located on the IESS 502. This is just an example; the CBM 503 may reside on any server on the network. A server 504 hosts two isolated environments with associated applications, IE1 506 with application App1, and IE2 508 with application App2. A second server 510 hosts two isolated environments with associated applications, IE3 with 512 with application App3 and IE4 514 with App4. App1, App2, App3 and App4 may be any application provided by the IESS 502 using the teachings above, thus the application may all be the same, all different or a combination thereof. Within each isolated environment the local billing manager collets usage data as previously disclosed.

Using the same algorithm and with an extended message structure the local billing manager forwards its aggregated billing information to the central billing manager 503. One additional field is added to the BillingEvents to form the BillingManagerEvents Class BillingManagerEvent
{
Int m_InterceptorID;
BigInteger m_UseCount;
BigInteger m_DataAmount;
String m_ClientLogin;
}

Where m_ClientLogin is the user name corresponding to the isolated environment. This uniquely identifies the party responsible for the billing event, i.e. the Client, and the type of billing event.

The message format disclosed above thus enables the CBM 503 to accurately aggregate billing information both by client and by isolated environment.

In a preferred embodiment the local billing manager sends the BillingManagerEvents to the central billing manager using sockets. In a preferred embodiment, the local billing manager aggregates billing events on a user-configurable timer.

FIG. 13 illustrates an example with two servers. Any number of servers is handled in a similar manner. FIG. 13 illustrates an example with two isolated environments per server; any number of isolated environments for a server is handled in a similar manner. Similarly, FIG. 13 illustrates one application per isolated environment; any number of applications is handled in a similar manner.

As disclosed for the Local Billing Manager, the CBM 503 process all incoming BillingManagerEvents using the same algorithm disclosed above, to build a complete billing history for all isolated environments by client and by Billing Event. This provides very fine grained usage billing of running applications. At any point in time the Central Billing Manager thus has all usage data available and can generate usage-billing in real-time.

The usage billing provides detailed usage by client and usage type. Said billing details may be provided as XML structured data, Microsoft Excel format or any other predefined export format.

12. Deployment Scenarios

FIG. 13 further illustrates by way of example embodiment 500 a variety of ways the invention can be configured to operate.

In one embodiment, the invention is configured with the IESS on a central server 502. Two application servers 504, 510 have their applications and isolated environments 506, 508, 512, 514 streamed from the IESS 502 and are serving the applications to clients over the LAN 501. In this embodiment a PC 516 on the LAN access the hosted applications 506,508,512, 514. In another embodiment a PC 518 access the hosted applications 506,508, 512, 514 over the internet 520 In a third embodiment, the invention is configured to serve applications 506,508, 512, 514 to a cell phone or PDA 524 accessing the applications over a wireless 522 internet 520. The invention runs on one or more of the devices, can be distributed across two or more of these elements, and allows for running the invention on any number of the devices at the same time and without interfering with each other.

The just illustrated example embodiments should not be construed as limiting the scope of the invention but as merely providing illustrations of some of the exemplary embodiments of this invention

13. Usage Billing without Isolated Environments

The teachings above are built on the layered interception disclosed in Havemose. While the teachings above are presented in the context of the isolated environments, the billing system and methods only rely on the layered interception, and the disclosed messaging and data structures.

The local billing manager inserts the client login into the BillingManagerEvents it generates. For embodiments without isolated environments, the client login is replaced with the account login as found on all Windows, Linux and UNIX platforms. The teachings in any other way remains the same.

The teachings regarding usage billing thus apply to all applications, not just applications running within isolated environments.

14. Conclusion

In the embodiments described herein, an example programming environment was disclosed for which an embodiment of programming according to the invention was taught. It should be appreciated that the present invention can be implemented by one of ordinary skill in the art using different program organizations and structures, different data structures, and of course any desired naming conventions without departing from the teachings herein. In addition, the invention can be ported, or otherwise configured for, use across a wide-range of operating system environments.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system, comprising:
   one or more servers that host isolated environments, comprising application files on one or more hosts with host operating systems, and their hosted applications; and
   one or more billing interceptors configured to:
   intercept access to resources for said one or more host operating systems; and
   load into one or more of address spaces of the hosted applications or address spaces of the host operating systems upon execution of each of the hosted applications.

2. The system according to claim 1, wherein the billing interceptors intercept at least one of: a number of resources open, a number of open files, a number of transactions, a number of concurrent users, a number of processes, and an amount of data that flows through a resource.

3. The system according to claim 1, comprising a local billing manager for each hosted application within an isolated environment, wherein for each hosted application the local billing manager performs at least one of: profiles the application, creates one or more billing events based on said profiled application, and aggregates billing information.

4. The system according to claim 3, wherein the local billing manager profiles at least one of: CPU time, memory usage, and a number of times each application is launched.

5. The system according to claim 3, wherein the billing interceptors create billing events comprising at least one of: a usage count and an amount of data processed.

6. The system according to claim 5, wherein said billing events are forwarded to a billing manager.

7. The system according to claim 6, wherein the billing events are forwarded via at least one of: sockets, named pipes, and an inter-process communication (IPC).

8. The system according to claim 3, wherein the local billing manager's aggregated billing information is placed in a billing events memory storage location and forwarded to an aggregation subsystem of the local billing manager.

9. The system according to claim 3, further comprising a memory buffer configured to receive incoming billing events.

10. The system according to claim 3, wherein the local billing manager aggregates billing events based on usage of at least one application.

11. A system, comprising:
    one or more servers that host isolated environments, comprising application files on one or more hosts with host operating systems, and their applications;
    one or more billing interceptors configured to:
    intercept access to resources for said one or more host operating systems; and
    load into one or more of address spaces of the hosted applications or address spaces of the host operating systems upon execution of each of the hosted applications; and
    at least one central computing device configured to operate a central billing manager.

12. The system according to claim 11, comprising at least one local billing manager for each application within one of the isolated environments, wherein for each application within an isolated environment the local billing manager performs at least one of: aggregates all received billing events into one or more billing manager events and adds a client login to the billing manager events.

13. The system according to claim 12, wherein the local billing manager inserts a client login in all billing events prior to the billing manager events being sent to the central billing manager.

14. The system according to claim 11, wherein the central billing manager sorts billing manager events by client login and interception identifier (ID).

15. The system according to claim 11, wherein the central billing manager produces a billing summary in one of XML, Microsoft Excel and a custom export format.

16. The system according to claim 13, wherein said billing events are sent to the central billing manager via at least one of: sockets, named pipes, and an inter-process communication (IPC).

17. The system according to claim 11, wherein the one or more billing interceptors are configured to intercept access to at least one or more of the following system resources: application execution time used, application storage used, number of open files by application, number of records in a database, and number of times the application has been launched.

18. The system according to claim 11, wherein the central billing manager tracks billing manager events via the billing interceptors.

19. The system according to claim 11, wherein the billing interceptors intercept at least one of a number of resources open, a number of open files, a number of transactions, a number of concurrent users, a number of processes, and an amount of data that flows through a resource.

20. The system according to claim 12, wherein the local billing manager profiles the applications, creates one or more billing events based on said profiled applications, and aggregates billing information.

* * * * *